United States Patent
Kobayashi et al.

(10) Patent No.: US 6,683,741 B1
(45) Date of Patent: Jan. 27, 2004

(54) MAGNETIC TAPE DEVICE WITH MECHANISM FOR CONTROLLING THREADING OPERATION

(75) Inventors: Masayoshi Kobayashi, Yamato (JP); Masahiko Sakaguchi, Hyogo (JP); Tsuneyoshi Oohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/534,694

(22) Filed: Mar. 24, 2000

(30) Foreign Application Priority Data

Aug. 17, 1999 (JP) .......................... 11-230584

(51) Int. Cl.$^7$ .................. G11B 15/46; G11B 21/02; G11B 15/66
(52) U.S. Cl. .................. 360/73.04; 360/75; 242/332.1
(58) Field of Search .................. 360/73.04, 74.3, 360/73.01, 73.05, 73.06, 73.07, 73.08, 73.14; 242/332.4, 332.5, 332.7, 332.8

(56) References Cited

U.S. PATENT DOCUMENTS

| | | | | |
|---|---|---|---|---|
| 5,325,249 A | * | 6/1994 | Butts et al. ................... 360/95 |
| 5,478,021 A | * | 12/1995 | Davis et al. ............. 242/332.1 |
| 5,739,970 A | * | 4/1998 | Kobayashi et al. ........... 360/75 |
| 5,761,184 A | * | 6/1998 | Dauber et al. ............. 369/247 |
| 5,790,337 A | * | 8/1998 | Steinberg et al. ............. 360/69 |
| 5,883,771 A | * | 3/1999 | Hoerger ...................... 360/132 |
| 6,031,676 A | * | 2/2000 | Oenes et al. .................. 360/60 |
| 6,188,532 B1 | * | 2/2001 | Albrecht et al. .............. 360/63 |
| 6,270,030 B1 | * | 8/2001 | Johnson et al. ............. 242/338 |
| 6,369,982 B2 | * | 4/2002 | Saliba ........................ 360/122 |

\* cited by examiner

*Primary Examiner*—David Hudspeth
*Assistant Examiner*—Jason Olson
(74) *Attorney, Agent, or Firm*—Greer, Burns & Crain, Ltd.

(57) ABSTRACT

A device for receiving a tape cartridge having a reel and a record tape winded around the reel where the record tape has a mounting unit attached to one end thereof includes an engaging unit which engages with the mounting unit, a threader arm which carries the engaging unit together with the mounting unit along a predetermined path to thread the record tape in the device during a threading operation and to unthread the record tape from the device during an unthreading operation, a reel motor which drives the reel of the tape cartridge, and a control unit which controls the reel motor to adjust tension in the record tape during the threading operation and the unthreading operation.

5 Claims, 26 Drawing Sheets

FIG.15

| DISTANCE | DUTY |
|----------|------|
| P, 1 | D, 1 |
| P, 2 | D, 2 |
| P, 3 | D, 3 |
| ⋮ | ⋮ |
| P, n | D, n |

MAGNETIC TAPE DEVICE WITH MECHANISM FOR CONTROLLING THREADING OPERATION

BACKGROUND OF THE INVENTION

1. Field of the Invention

The present invention generally relates to magnetic-tape devices, and particularly relates to a magnetic-tape device which writes data in and reads data from a magnetic-tape cartridge by attending to thread control.

2. Description of the Related Art

Conventionally used data recording devices include magnetic-tape devices, which use a magnetic-tape cartridge that can record data by utilizing a magnetic recording scheme. Such magnetic-tape devices are typically used for recording a large size of data.

FIG. 19 is an illustrative drawing showing a related-art magnetic-tape device including a magnetic-tape cartridge.

A magnetic-tape device 1 includes a magnetic-tape cartridge 2, a machine reel 3, a leader block 4, a threader motor 5, roller guides 6, cleaners 7, a head 8, a magnetic tape 9, and a threader pin 10.

The magnetic-tape cartridge 2 can be detached from the magnetic-tape device 1 for replacement.

In FIG. 19, the magnetic tape 9 of the magnetic-tape cartridge 2 is hooked around the roller guides 6 and the cleaners 7 to come in contact with the head 8, and the leader block 4 is placed in a threaded position, being positioned inside the machine reel 3. The leader block 4 is fixed to the threader pin 10, and is led out from the magnetic-tape cartridge 2 to be threaded under the control of the threader motor 5. In this condition, the head 8 records data in and reproduces data from the magnetic tape.

FIGS. 20A and 20B are illustrative drawings showing an example of a magnetic-tape cartridge of an old type.

FIG. 20A illustrates a front side of the magnetic-tape cartridge along with a leader-block portion 20' which is used for fixing the leader block 4 to the threader pin 10. FIG. 20B illustrates a back side of the magnetic-tape cartridge where no slits are provided at portions 21'.

FIGS. 20C and 20D are illustrative drawings showing an example of a magnetic-tape cartridge.

FIGS. 20C and 20D show a magnetic-tape cartridge 2 of a new type having a magnetic tape of a standard length. FIG. 20C illustrates a front side of the magnetic-tape cartridge along with a leader-block portion 20 which is used for fixing the leader block 4 to the threader pin 10. FIG. 20D illustrates a back side of the magnetic-tape cartridge where cartridge identifying slits 21 are provided to indicate a difference of cartridge type.

FIGS. 21A and 21B are illustrative drawings showing an example of a magnetic-tape cartridge.

FIGS. 21A and 21B show a magnetic-tape cartridge 2 of a new type having a magnetic tape of a double length. FIG. 21A illustrates a front side of the magnetic-tape cartridge along with a leader-block portion 22 which is used for fixing the leader block 4 to the threader pin 10. FIG. 21B illustrates a back side of the magnetic-tape cartridge where cartridge identifying slits 23 are provided to indicate a difference of cartridge type.

Among those magnetic-tape cartridges illustrated above, those of the new type are identical to each other in the shape of part of the leader-block portion that comes in contact with the threader pin, but differ from each other in positions of the cartridge identifying slits. The magnetic-tape cartridge of the old type has the leader-block portion 20' that is different from the leader-block portion 20 or 22 of the new-type magnetic-tape cartridge in terms of the shape of a portion that comes in contact with the threader pin, and does not have slits at the portions 21'.

FIG. 22 is an illustrative drawing showing the magnetic-tape cartridge 2.

In FIG. 22, the magnetic-tape cartridge 2 includes the magnetic tape 9 wrapped around a reel 24 and the leader block 4 attached to the beginning of the magnetic tape 9.

The leader-block portion 20, 20', or 22 includes the leader block 4, which receives the threader pin 10 in a recess thereof. When the leader block 4 is fixed to the threader pin 10, the leader block 4 is taken out from the leader-block portion 20, 20', or 22 to be threaded to the magnetic-tape device 1.

FIG. 23 is an illustrative drawing showing an example of the leader-block portion 20' of the old magnetic-tape cartridge shown in FIGS. 20A and 20B.

In FIG. 23, a threader pin 100 connected to a tip of a threader arm 11 has a pin head 13 attached thereto which is to be fixed to the leader block 40. The pin head 13 is comprised of a cylinder shape and a corn shape attached at the tip of the threader pin 100. The leader block 40 has a recess 12 that receives therein the pin head 13. The leader block 40 has a lower portion thereof cut off at a position where the recess 12 is formed. In the case of FIG. 23, the pin head 13 can be securely fixed to the recess 12 of the leader block 40 as the cylinder shape of the pin head 13 provides a secure fit. Accordingly, appropriate threading is possible in the old magnetic-tape cartridge.

FIG. 24 is an illustrative drawing showing an example of the leader-block portion 20 or 22 of the new magnetic-tape cartridge shown in FIGS. 20C and 20D or FIGS. 21A and 21B.

In FIG. 24, the threader pin 100 connected to a tip of the threader arm 11 has the pin head 13 attached thereto which is to be fixed to a leader block 41. The pin head 13 is comprised of a cylinder shape and a corn shape attached at the tip of the threader pin 100. The leader block 41 has a recess 14 that receives therein the pin head 13. The leader block 41 has a lower portion thereof scraped off from an inner surface of the recess 14, and has a front side facing the view of FIG. 24 missing at a position where the recess 14 is provided. In the case of FIG. 24, therefore, the pin head 13 cannot be securely fixed to the recess 14 of the leader block 41. Accordingly, appropriate threading is impossible in the new magnetic-tape cartridge.

FIG. 25 is an illustrative drawing showing the leader-block portion 20' of the old magnetic-tape cartridge of FIGS. 20A and 20B in a different arrangement.

In FIG. 25, a threader pin 101 connected to a tip of the threader arm 11 has a pin head 15 attached thereto which is to be fixed to the leader block 40. The pin head 15 is comprised of a corn shape and a cylinder shape attached to the corn shape toward the tip of the threader pin 101. The leader block 40 has the recess 12 that receives therein the pin head 15. The leader block 40 has a lower portion thereof cut off at a position where the recess 12 is formed. In the case of FIG. 25, therefore, the pin head 15 cannot be fixed to the recess 12 of the leader block 40. Accordingly, appropriate threading is not possible in the old magnetic-tape cartridge.

FIG. 26 is an illustrative drawing showing the leader-block portion 20 or 22 of the new magnetic-tape cartridge of FIGS. 20C and 20D or FIGS. 21A and 21B in a different arrangement.

In FIG. 26, the threader pin 101 connected to a tip of the threader arm 11 has the pin head 15 attached thereto which is to be fixed to the leader block 41. The pin head 15 is the same as the one shown in FIG. 25. The leader block 41 has the recess 14 that receives therein the pin head 15. The leader block 41 has a lower portion thereof scraped off from an inner surface of the recess 14, and has a front side facing the view of FIG. 26 missing at a position where the recess 14 is provided. In the case of FIG. 26, the pin head 15 can be securely fixed through secure contact between the lower inner surface of the recess 14 and the cylinder shape portion of the pin head 15. Accordingly, appropriate threading is possible in the new magnetic-tape cartridge.

In the manner as described above, it depends on a type of a magnetic-tape cartridge whether the recess of the leader block 4 can be securely fixed to the pin head. When a secure fix cannot be provided, the magnetic-tape cartridge cannot be threaded.

FIG. 27 is a chart showing a relation between speed of the leader block 4 at a time of threading and rotations of the threader motor 5.

In FIG. 27, the speed of the leader block 4 and the threader pin 10 is plotted on the vertical axis, and a distance that the leader block 4 covers from a start of a thread operation to an end of the thread operation is shown on the horizontal axis as the total number of revolutions of the supply-side reel (i.e., of the cartridge). This data is obtained by setting rotation of the threader motor to a fixed rate and setting the medium to a desired predetermined diameter. What is shown in FIG. 27 is data that is obtained during a threading operation between a time when the leader block 4 and the threader pin 10 start moving from the magnetic-tape cartridge and a time when the leader block 4 and the threader pin 10 reach inside the machine reel 3 past the three roller guides 6. As shown in FIG. 27, the speed exhibits a rapid increase after the number of revolutions becomes 150, and reaches its peak when the number of revolutions is about 180. This corresponds to a period when the threader pin 10 and the leader block 4 start moving from the magnetic-tape cartridge 2 to reach the first one of the roller guides 6. After this, the speed shows a rapid decrease until the number of revolutions becomes 225. Then, the speed goes up until the number of revolutions is around 255. At this point of time, the leader block 4 and the threader pin 10 have passed the first one of the roller guides 6 to reach the second one of the roller guides 6.

When the threader pin 10 and the leader block 4 hit one of the roller guides 6, the speed shows a rapid decrease, resulting volatile speed changes. This puts extra pressure on the magnetic tape, which may result in a damage on the magnetic tape when the tape is rather thin. Data on the magnetic tape may be permanently lost.

Further, the volatile speed changes create vibrations during the threading operation, causing tracking error when data recorded on the magnetic tape needs to be followed along a track thereof.

The same problems are observed during an unthreading operation when the magnetic tape is wound to be returned to the magnetic-tape cartridge.

As described above, different magnetic-tape cartridges have different recess shapes in the leader block portion, so that the head of the threader pin may not be securely fixed to the leader block, resulting a failure to engage in a threaded position.

Further, volatile speed change during a threading or unthreading operation creates extra tension applied to the magnetic tape, causing tape damages and data losses.

Moreover, volatile speed change during a threading or unthreading operation generates vibration, which shakes a head-seek mechanism or a tracking mechanism, possibly resulting in tracking error.

Accordingly, there is a need for a magnetic-tape device which can provide secure threading for different types of magnetic-tape cartridges, and can suppress damage on the magnetic tape.

SUMMARY OF THE INVENTION

Accordingly, it is a general object of the present invention to provide a magnetic-tape device which can satisfy the needs described above.

It is another and more specific object of the present invention to provide a magnetic-tape device which can provide secure threading for different types of magnetic-tape cartridges, and can suppress damage on the magnetic tape.

In order to achieve the above objects according to the present invention, a device for receiving a tape cartridge having a reel and a record tape winded around the reel where the record tape has a mounting unit attached to one end thereof includes an engaging unit which engages with the mounting unit, a threader arm which carries the engaging unit together with the mounting unit along a predetermined path to thread the record tape in the device during a threading operation and to unthread the record tape from the device during an unthreading operation, a reel motor which drives the reel of the tape cartridge, and a control unit which controls the reel motor to adjust tension in the record tape during the threading operation and the unthreading operation.

The device as described above controls the reel motor for driving the reel of the tape cartridge so as to control tension in the record tape. Thus, damage on the record tape can be avoided.

According to another aspect of the present invention, a device for receiving a tape cartridge having a record tape therein where the record tape has a mounting unit attached to one end thereof includes an engaging unit which engages with the mounting unit, and a threader arm which carries the engaging unit together with the mounting unit along a predetermined path to thread the record tape in the device, the engaging unit being configured to securely fit in the mounting unit for at least two different types of tape cartridges.

The device as described above has the engaging unit that is configured to securely fit in the mounting unit for at least two different types of tape cartridges. Therefore, the device can provide secure threading for different types of magnetic-tape cartridges.

Other objects and further features of the present invention will be apparent from the following detailed description when read in conjunction with the accompanying drawings.

BRIEF DESCRIPTION OF THE DRAWINGS

FIG. 15 is a table showing a relation between duty values and distances covered by a threading operation;

DESCRIPTION OF THE PREFERRED EMBODIMENTS

In the following, embodiments of the present invention will be described with reference to the accompanying drawings.

Figure 1A:
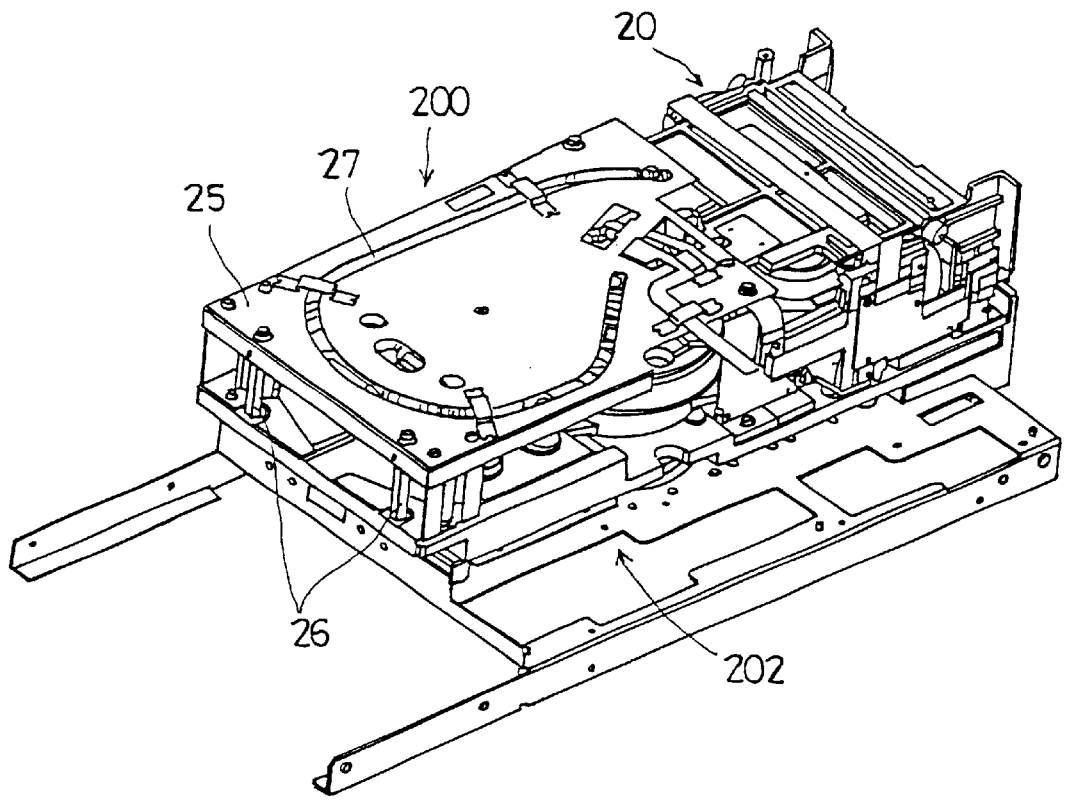
FIGS. 1A and 1B are illustrative drawings showing a magnetic-tape device according to an embodiment of the present invention.
Figure 1B:
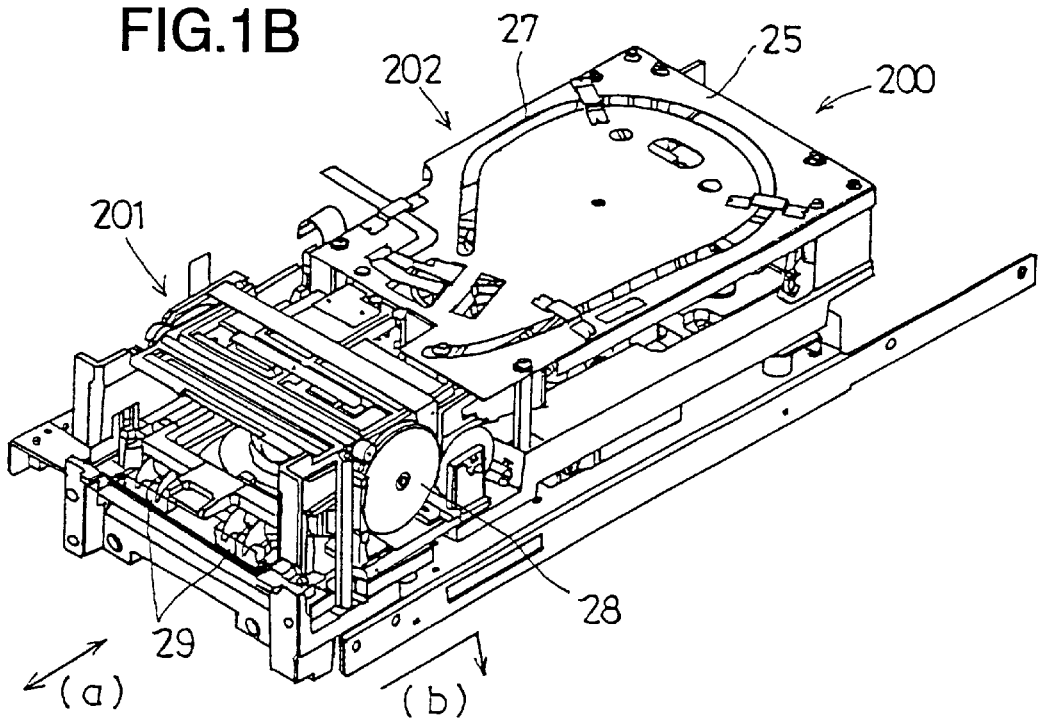

FIGS. 1A and 1B are illustrative drawings showing a magnetic-tape device according to an embodiment of the present invention.

This embodiment is directed to a magnetic-tape device which provide secure threading for different types of magnetic-tape cartridges, and can suppress damage on the magnetic tape.

A magnetic-tape device 200 shown in FIGS. 1A and 1B includes a cartridge portion 201 for receiving a magnetic-tape cartridge and a threader portion 202 for performing a threading operation. FIG. 1A is a view taken from the side of the threader portion 202. In FIG. 1A, the threader portion 202 includes a threader plate 25, studs 26, and a threader channel 27. The threader channel 27 serves as a passageway to guide a threader trajectory, and is formed in the threader plate 25. The threader plate 25 is supported by the studs 26.

FIG. 1B is a view taken from the side of the cartridge portion 201. The cartridge portion 201 includes a loader motor 28 and a cartridge recognition sensor 29. The cartridge portion 201 allows a magnetic-tape cartridge to be inserted and ejected along directions as shown by an arrow (a). Upon insertion, the magnetic-tape cartridge is moved in a direction as shown by an arrow (b). The cartridge recognition sensor 29 detects the cartridge identifying slits 21 to identify the type of the magnetic-tape cartridge.

In the following, the cartridge portion 201 and the threader portion 202 will be described in detail.

Figure 2:
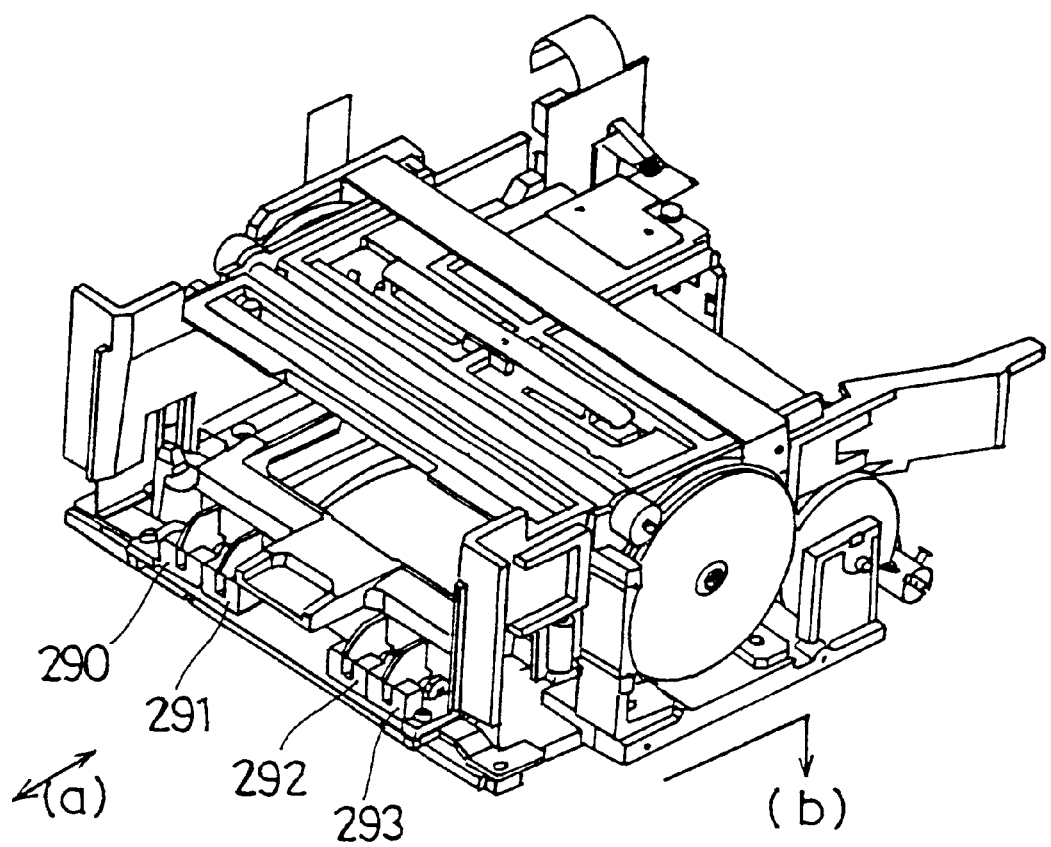
FIG. 2 is an illustrative drawing showing a cartridge portion of the magnetic-tape device of FIGS. 1A and 1B.

FIG. 2 is an illustrative drawing showing the cartridge portion according to the embodiment of the present invention.

Figure 19:
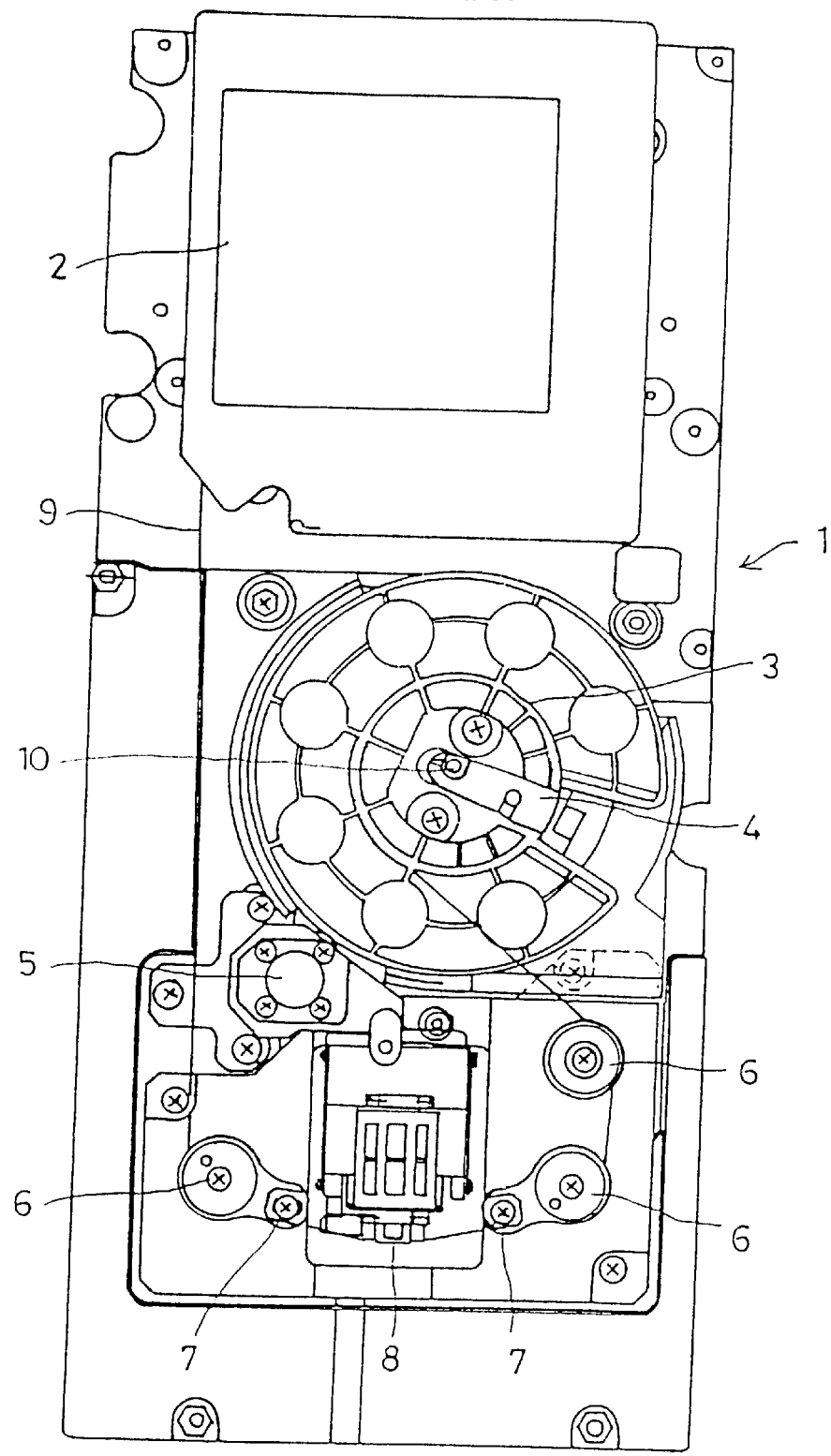
FIG. 19 is an illustrative drawing showing a related-art magnetic-tape device including a magnetic-tape cartridge.
Figure 20A:
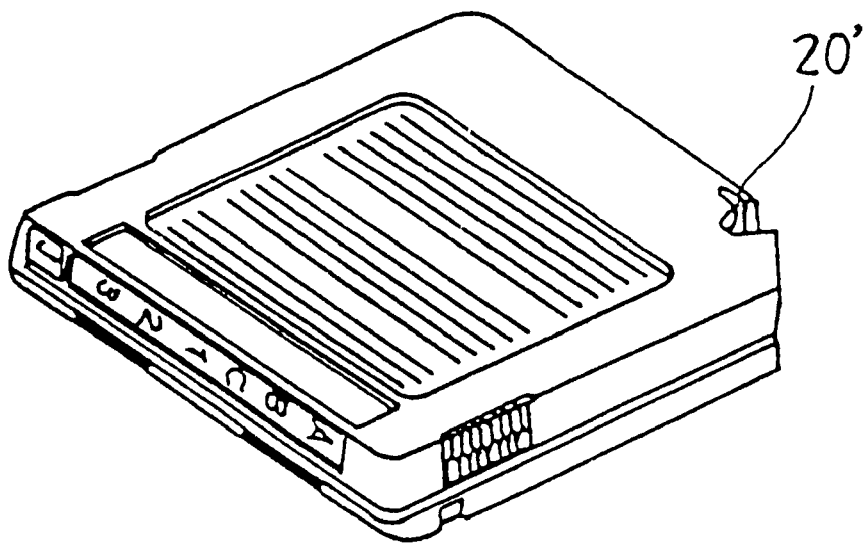
FIGS. 20A through 20D are illustrative drawings showing an example of a magnetic-tape cartridge.
Figure 20B:
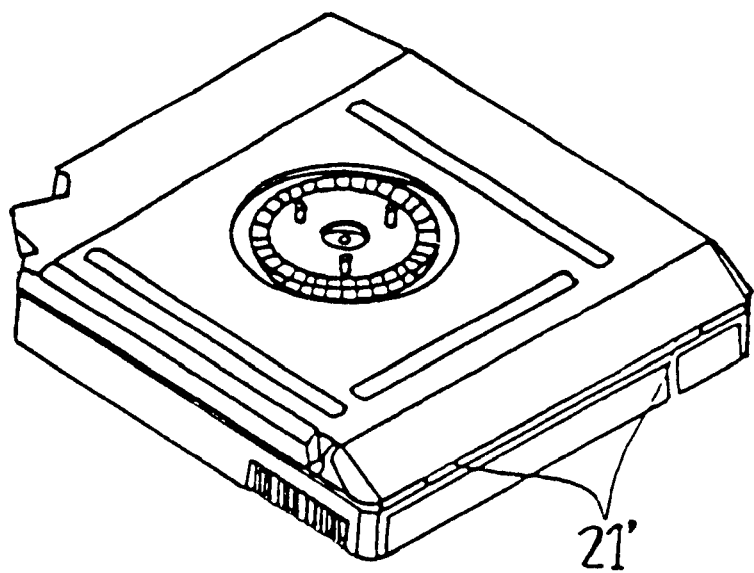
Figure 20C:
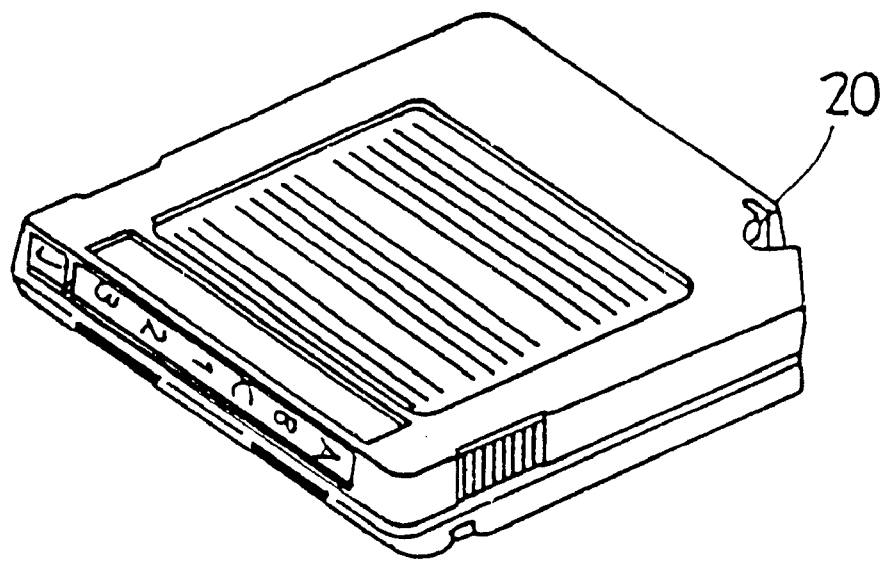
Figure 20D:
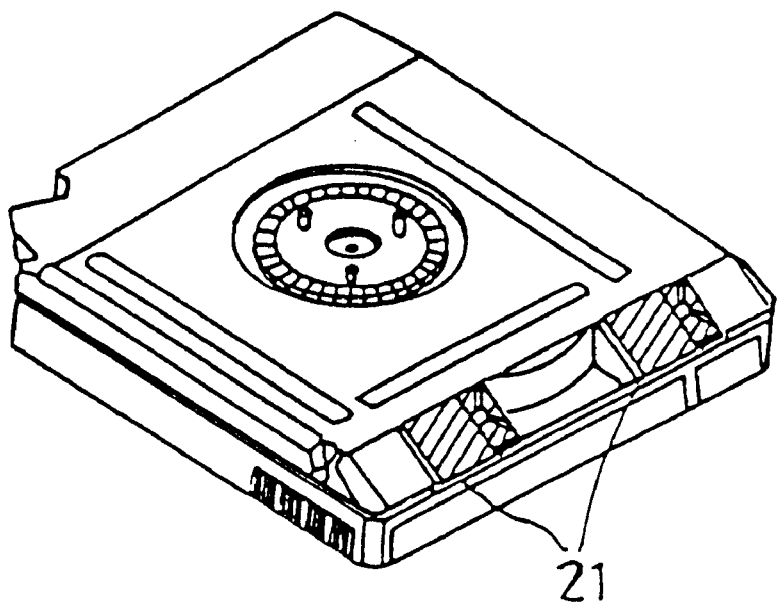
Figure 21A:
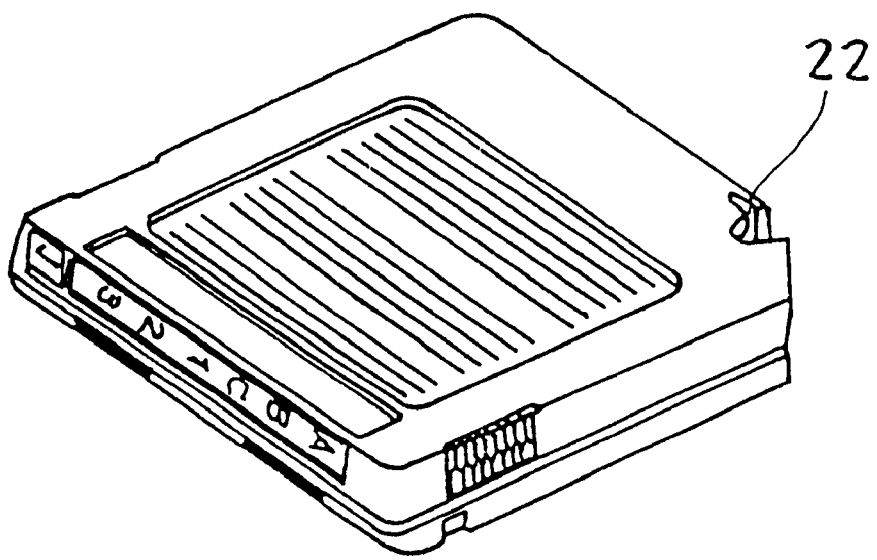
FIGS. 21A and 21B are illustrative drawings showing an example of a magnetic-tape cartridge.
Figure 21B:
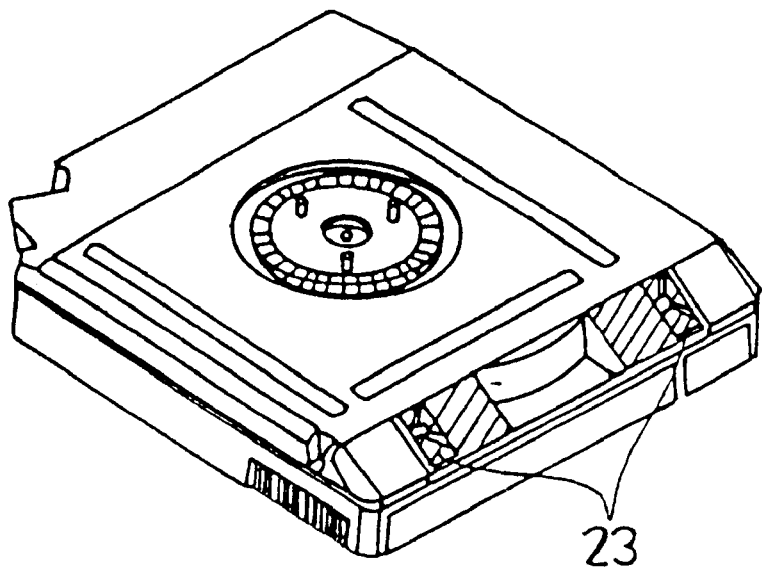
Figure 22:
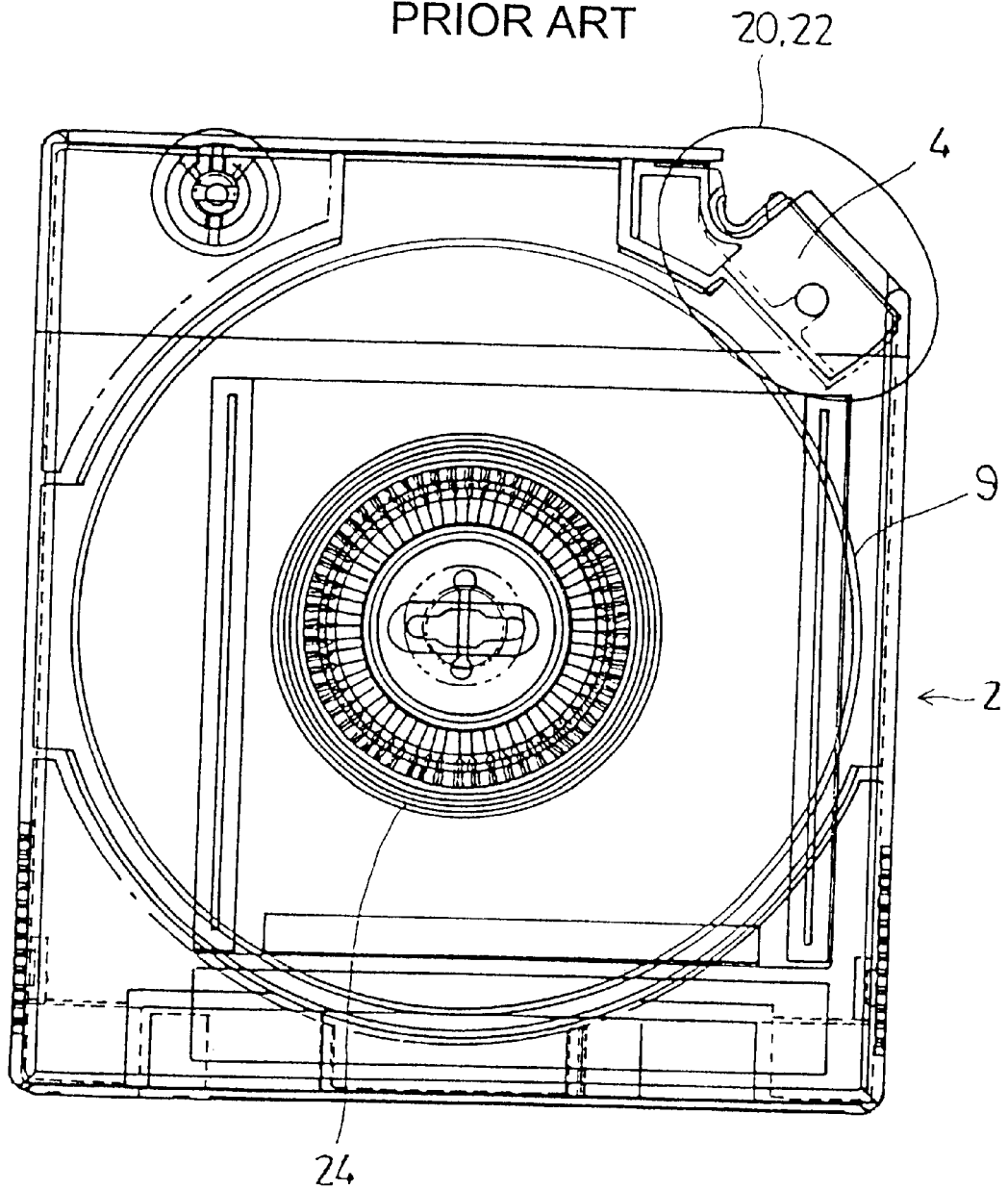
FIG. 22 is an illustrative drawing showing a structure of a magnetic-tape cartridge.
Figure 23:
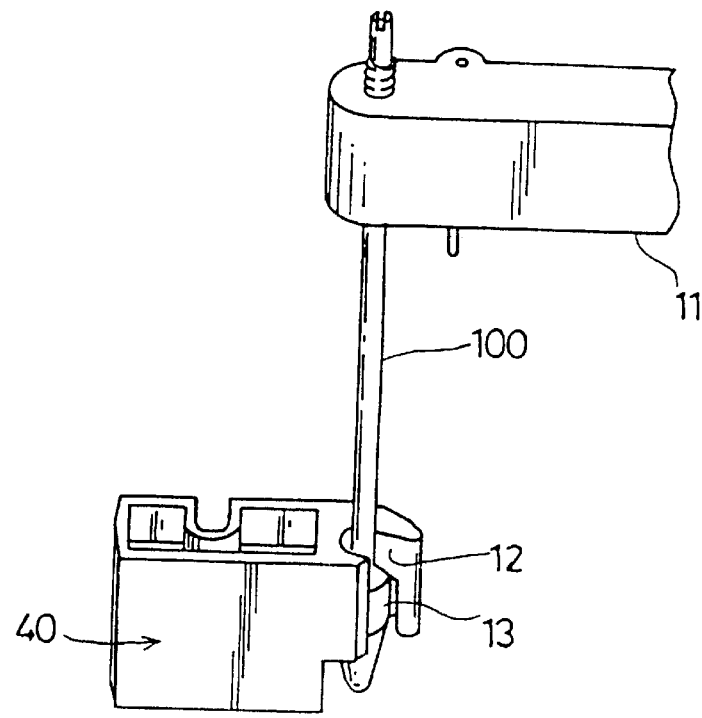
FIG. 23 is an illustrative drawing showing an example of a leader-block portion of the magnetic-tape cartridge shown in FIGS. 20A and 20B.
Figure 24:
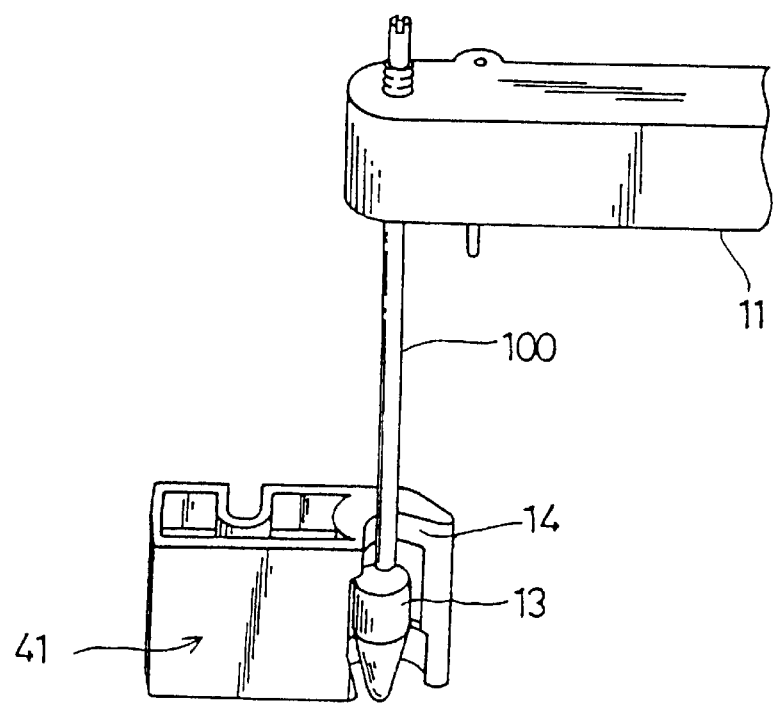
FIG. 24 is an illustrative drawing showing an example of a leader-block portion of the magnetic-tape cartridge shown in FIGS. 21A and 21B.
Figure 25:
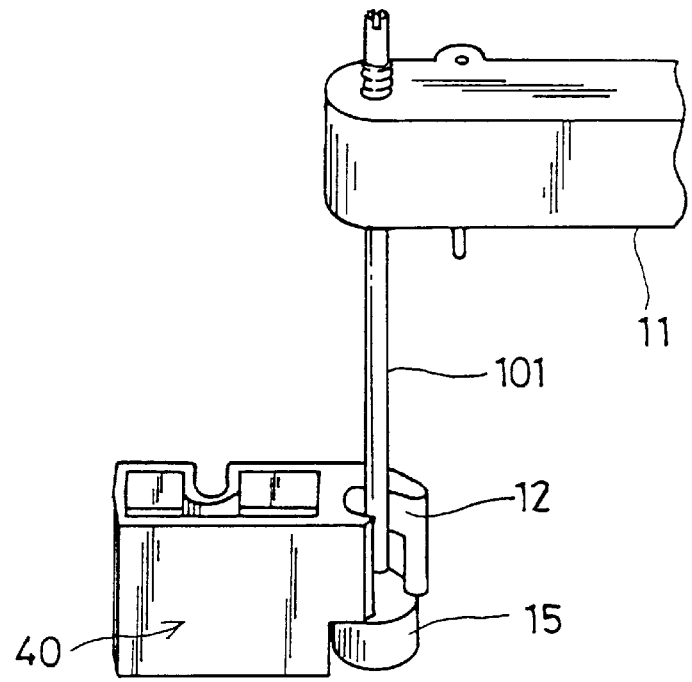
FIG. 25 is an illustrative drawing showing the leader-block portion of the magnetic-tape cartridge of FIGS. 20A and 20B in a different arrangement.
Figure 26:
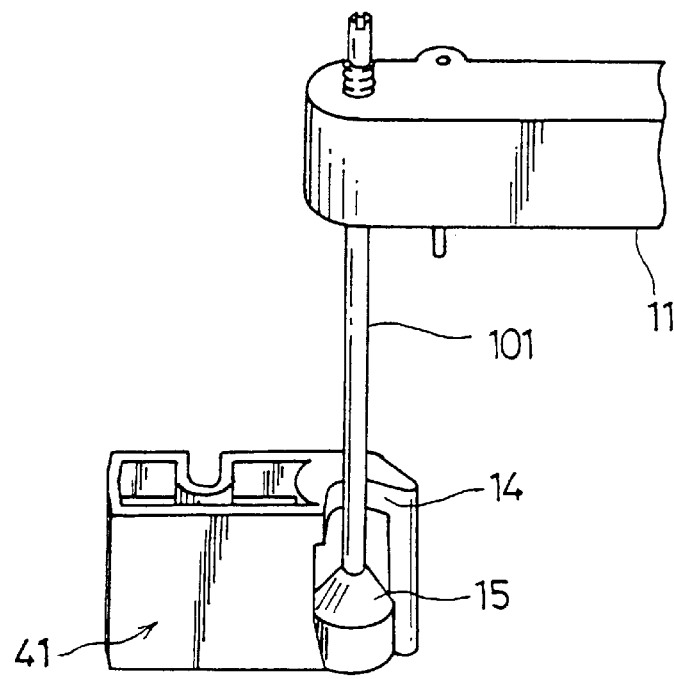
FIG. 26 is an illustrative drawing showing the leader-block portion of the magnetic-tape cartridge of FIGS. 21A and 21B in a different arrangement.

In FIG. 2, a magnetic-tape cartridge is inserted and ejected along the directions of the arrow (a). Upon insertion, a magnetic-tape cartridge is moved in the direction of the arrow (b). Then, the cartridge recognition sensor 290 through 293 identifies a type of the inserted magnetic-tape cartridge. When the magnetic-tape cartridge of FIG. 20B is inserted, for example, the cartridge identifying slits 21 coincide in position with the cartridge recognition sensors 291 and 293, and other cartridge recognition sensors 290 and 292 are pushed down to be in a sensor-on position. An on/off statuses of the cartridge recognition sensors 290 through 293 indicate a type of the magnetic-tape cartridge. Based on the indicated type, an electric current supplied to the threader motor (see FIG. 19) and an electric current supplied to the supply-side reel motor are switched so as to properly adjust speed of the threading operation and tension in the magnetic tape.

Figure 3A:
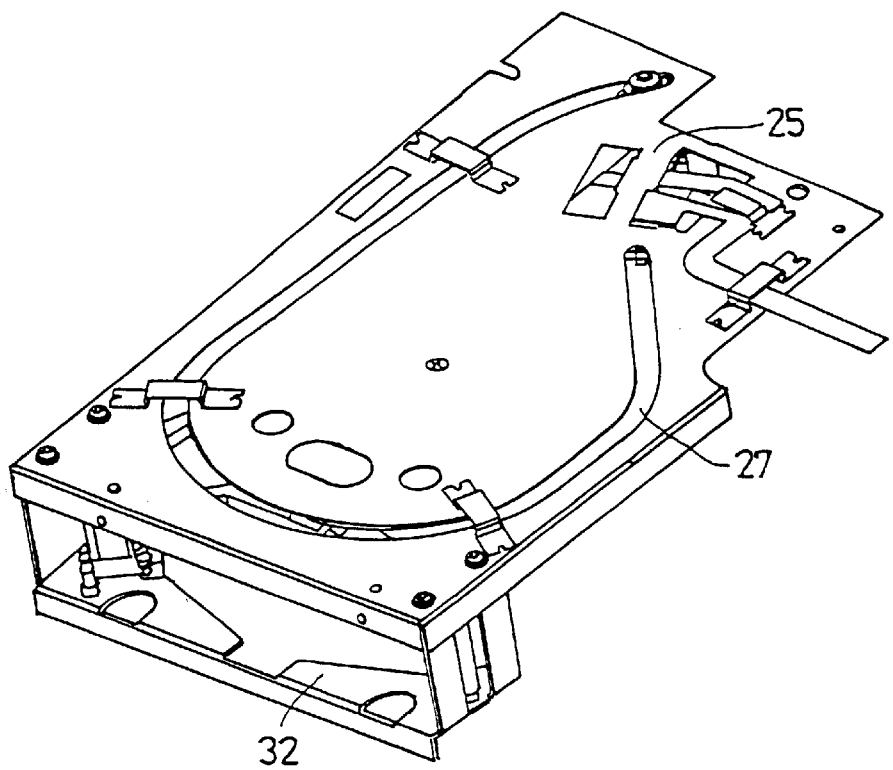
FIGS. 3A and 3B are illustrative drawings showing a threader portion of the magnetic-tape device of FIGS. 1A and 1B FIGS. 4A and 4B are expanded views of the threader portion.
Figure 3B:
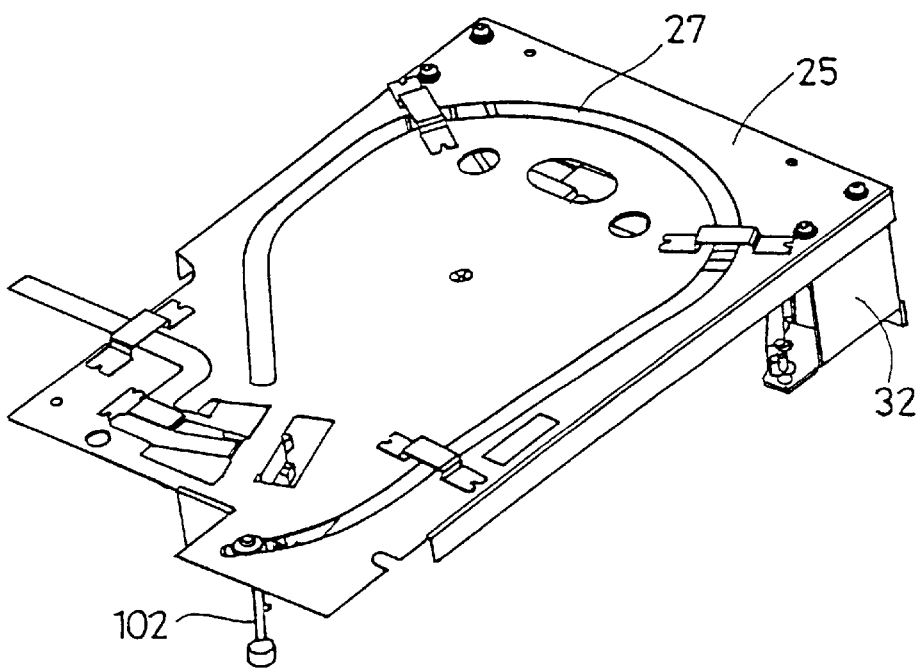

FIGS. 3A and 3B are illustrative drawings showing the threader portion 202 according to the embodiment of the present invention.

FIG. 3A shows a view taken form the side opposite to a side where the cartridge portion 201 is provided, and FIG. 3B shows a view taken from the side of the cartridge portion 201. In FIG. 3A, the threader portion 202 includes the threader plate 25 covering the threader portion 202, the threader channel 27 for guiding a threader trajectory, and a brush 32. As shown in FIG. 3B, a threader pin 102 is movably fit into the threader channel 27.

In the following, a structure of the threader portion 202 will be described in detail.

Figure 4A:
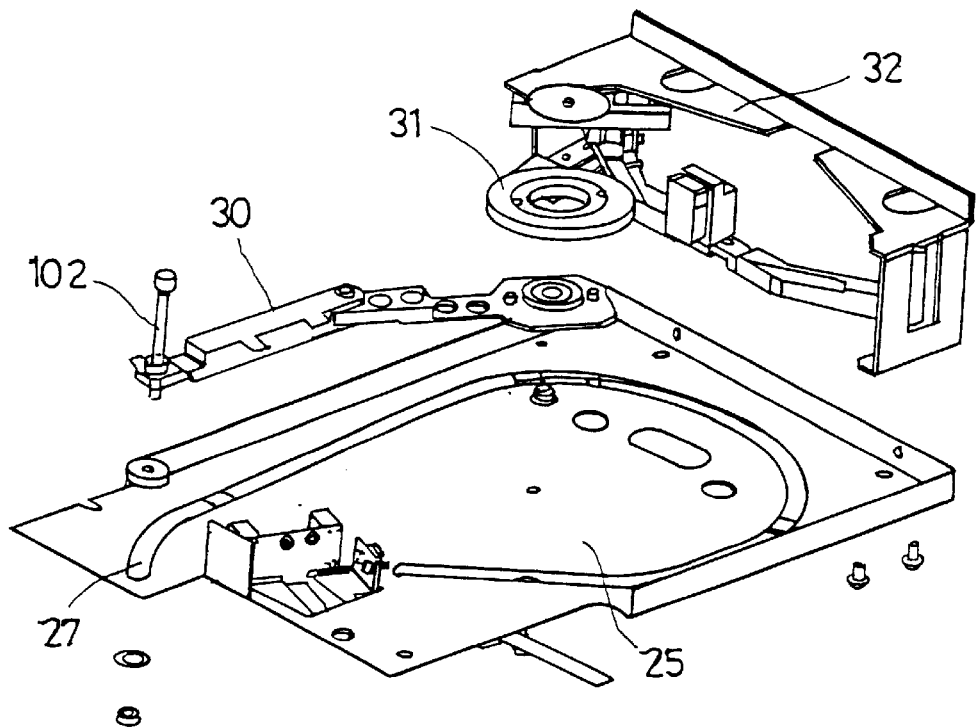
Figure 4B:
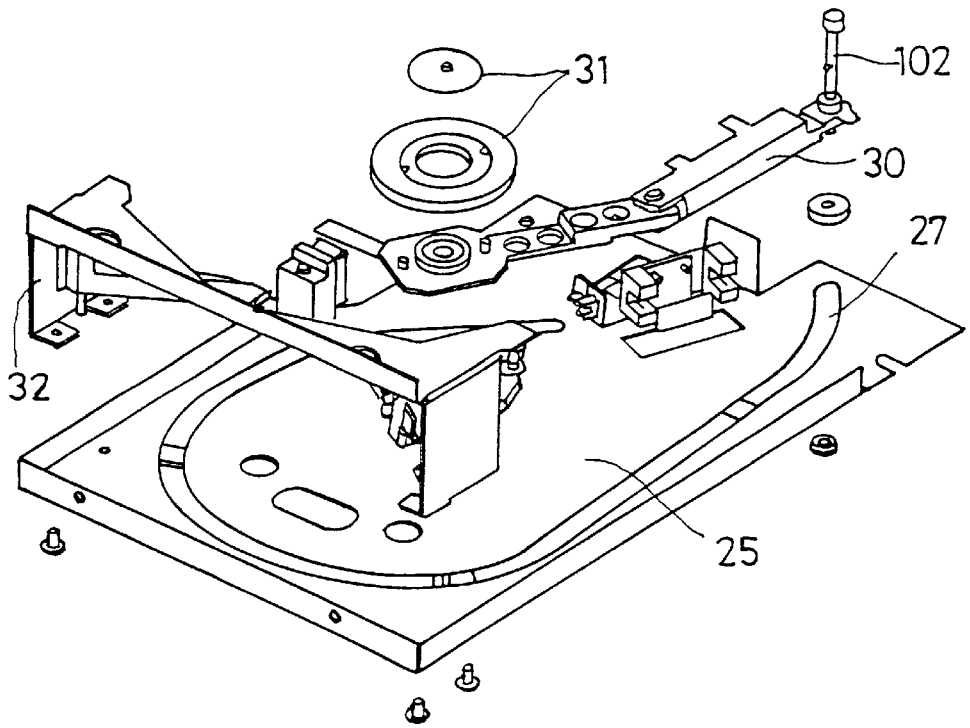

FIGS. 4A and 4B are expanded views of the threader portion 202.

FIG. 4A is a view taken form a side where the cartridge portion 201 is provided, and FIG. 3B is a view taken from a side opposite to the side where the cartridge portion 201 is situated. In these figures, the threader portion 202 includes the threader plate 25 having the threader channel 27 formed therein, the brush 32, a threader gear 31, a threader arm 30, and the threader pin 102. The threader arm 30 is mounted to its place via the threader gear 31, and has the threader pin 102 attached thereto at an opposite end to where the threader gear 31 is provided. The threader pin 102 is threaded along the threader channel 27.

In what follows, the threader pin 102 will be described in detail.

Figure 5A:
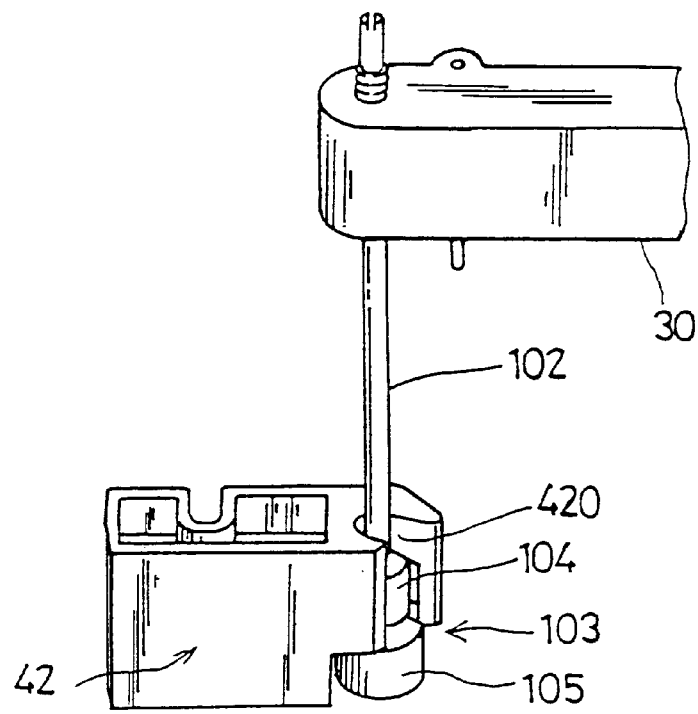
FIGS. 5A and 5B are illustrative drawings showing a threader pin together with a leader block portion.
Figure 5B:
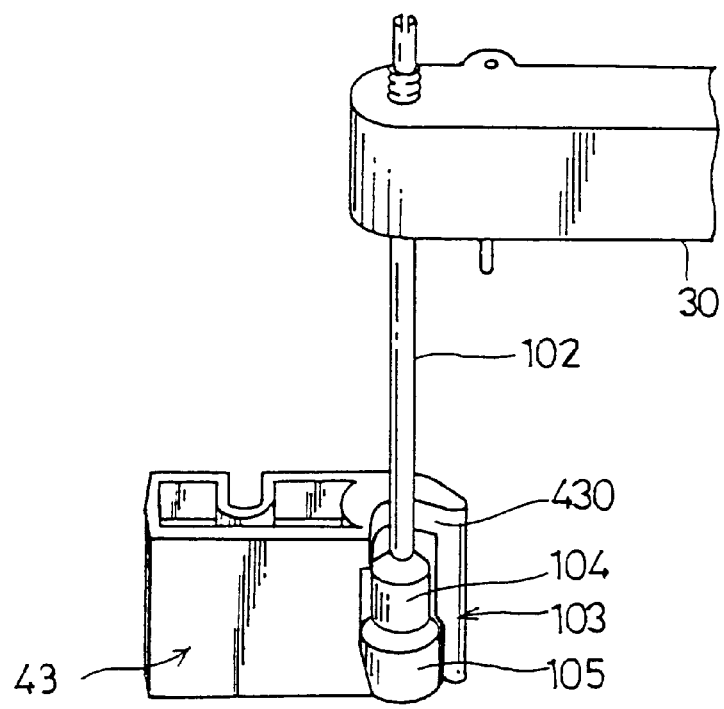

FIGS. 5A and 5B are illustrative drawings showing the threader pin 102 together with a leader block portion.

In FIG. 5A, the threader pin 102 attached to the tip of the threader arm 30 has a pin head 103, which is comprised of a small cylindrical shape portion 104 and a large cylindrical shape portion 105. The pin head 103 is fixed to a leader block 42. The leader block 42 is included in the magnetic-tape cartridge. The leader block 42 has a recess 420 formed therein, and has a lower portion thereof cut off at a position where the recess 420 is provided. The recess 420 has a groove formed in the inner surface thereof. Here, the shape of the pin head 103 matches the shape of the recess 420, so that the threader pin 102 can be fixed to the leader block 42. In this case, therefore, the magnetic tape can be threaded.

In FIG. 5B, the threader pin 102 attached to the tip of the threader arm 30 has the pin head 103, which is comprised of the small cylindrical shape portion 104 and the large cylindrical shape portion 105. The pin head 103 is fixed to a leader block 43. The leader block 43 is included in the magnetic-tape cartridge. The leader block 43 has a recess 430 formed therein, which has a groove formed in the inner surface thereof. The groove has a certain depth in an upper half thereof and a different depth in a lower half thereof. Here, the shape of the pin head 103 matches the shape of the recess 430, so that the threader pin 102 can be fixed to the leader block 43. In this case, therefore, the magnetic tape can be threaded.

In what follows, threading operation will be described in detail.

Figure 6:
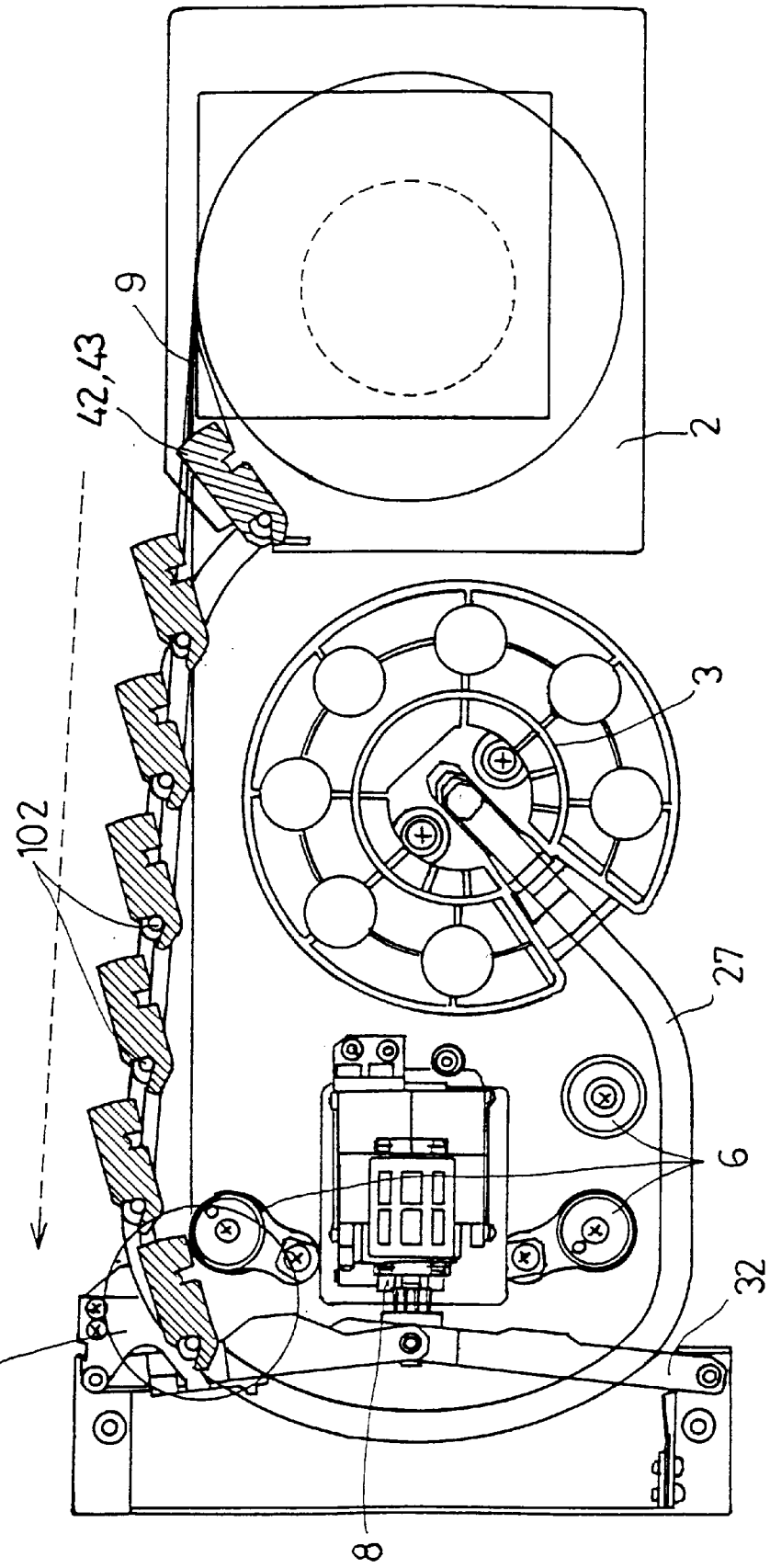
FIG. 6 is an illustrative drawing showing a threading operation of the magnetic-tape device according to the embodiment of the present invention.

FIG. 6 is an illustrative drawing showing a threading operation of the magnetic-tape device according to the embodiment of the present invention.

In FIG. 6, the leader block 42 (or 43) provided in the magnetic-tape cartridge 2 comes in secure contact with the threader pin 102, and is taken out of the magnetic-tape cartridge 2 followed by being threaded in a direction shown by a dashed-line arrow. The leader block 42 (43) hits the roller guides 6 with its tail portion when it goes past the roller guides 6.

Figure 7:
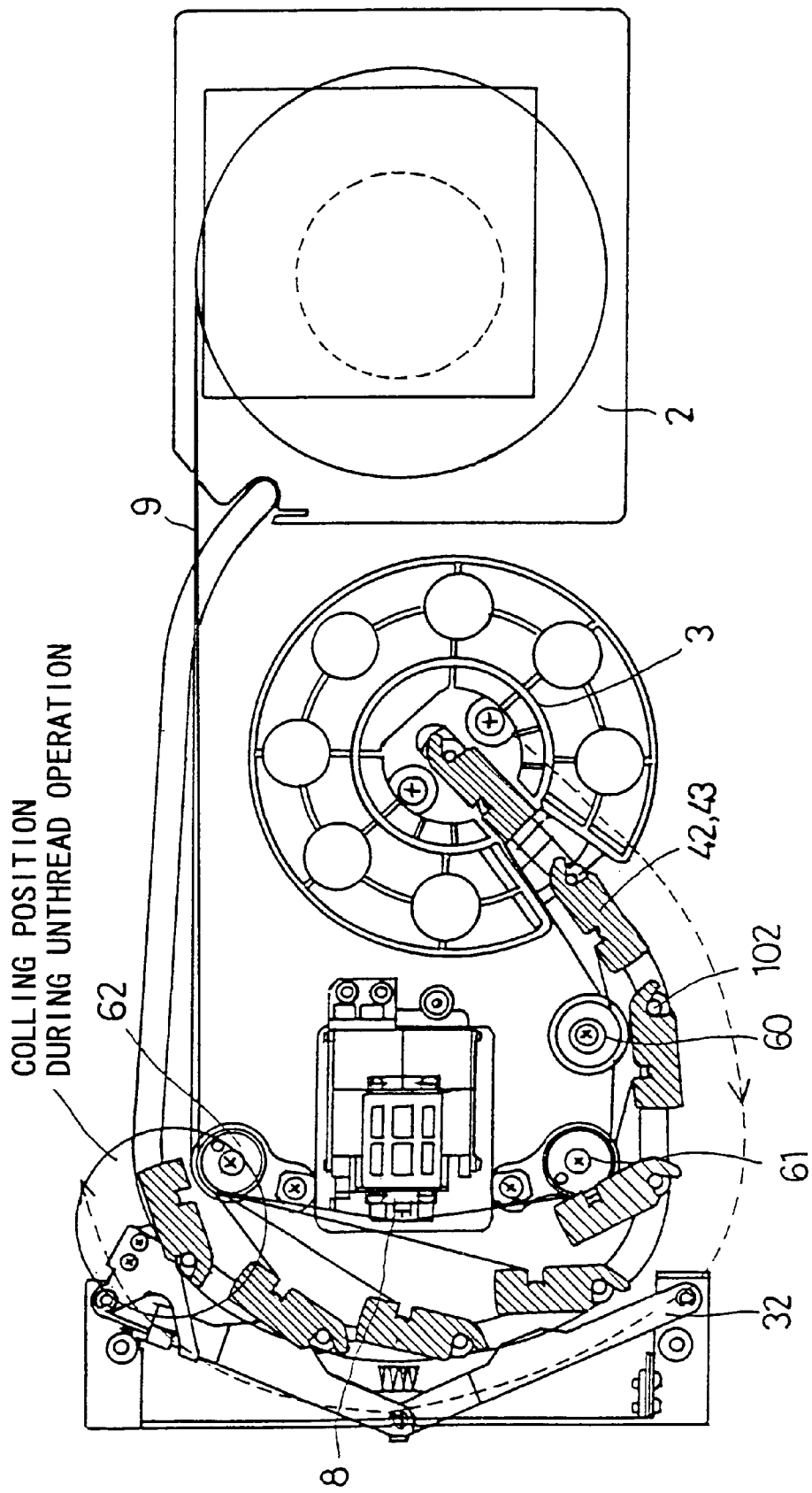
FIG. 7 is an illustrative drawing showing a unthreading operation of the magnetic-tape device according to the embodiment of the present invention.

FIG. 7 is an illustrative drawing showing a unthreading operation of the magnetic-tape device according to the embodiment of the present invention.

In FIG. 7, the leader block 42 (43) stored in the machine reel 3 is fixed to the threader pin 102 during a threading operation. The leader block 42 is unthreaded in a direction shown by a dashed-line arrow, with the brush 32 being separated from the head 8, to go past roller guides 60, 61, and 62. When the leader block 42 (43) passes the roller guide 62, its front end hits the roller guide 62.

In order to adjust tension that is applied to the magnetic tape at the time of clash, control as shown in the following is attended to according to the present invention.

Figure 8:
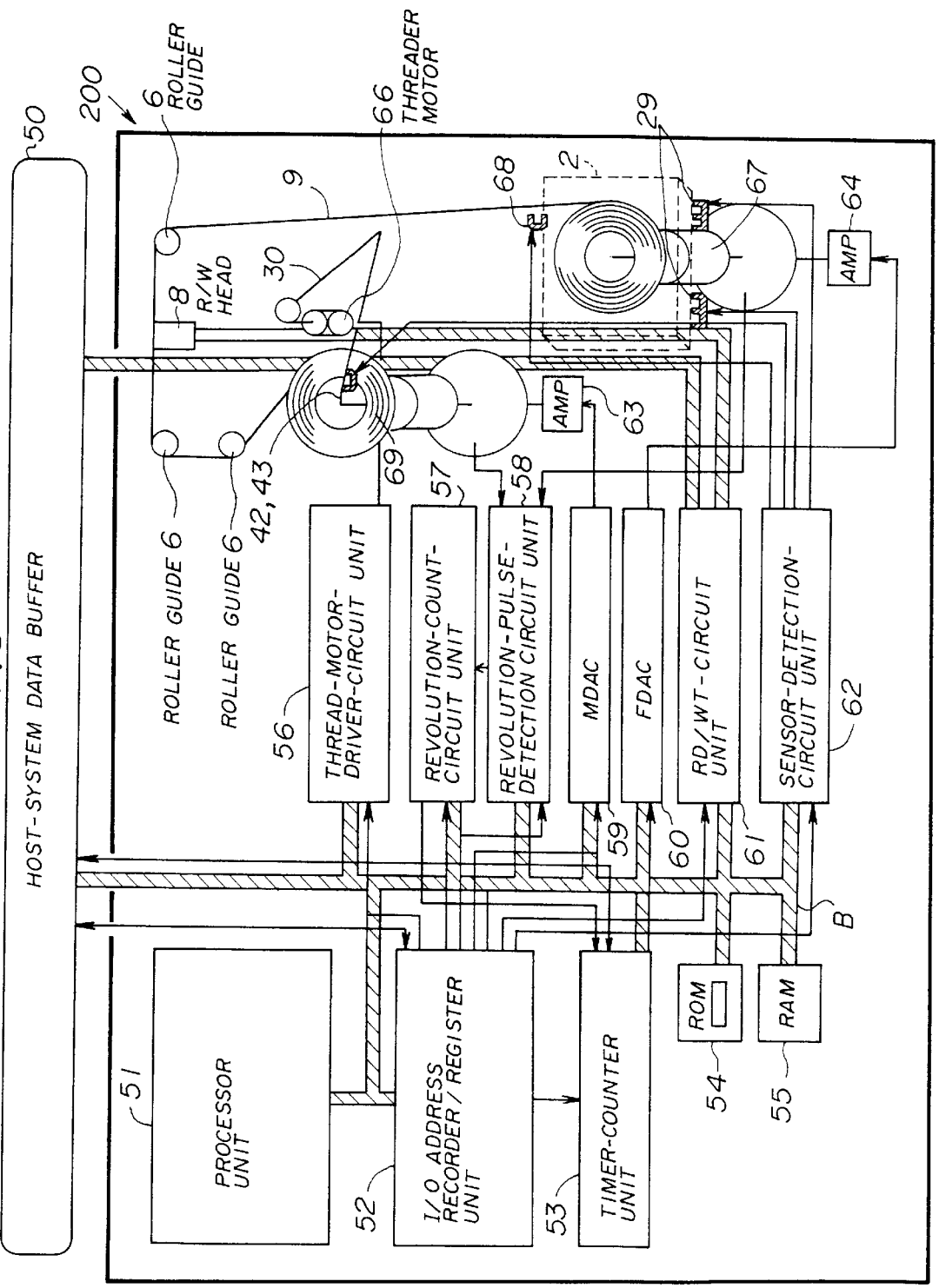
FIG. 8 is a block diagram of a control-related portion of the magnetic-tape device according to the present invention.

FIG. 8 is a block diagram of a control-related portion of the magnetic-tape device according to the present invention.

The magnetic-tape device 200 receives data from a host-system data buffer 50, and records the received data in the magnetic tape 9, which is a plastic film having a magnetic material coated thereon. Further, the magnetic-tape device 200 reproduces recorded data from the magnetic tape 9, and supplies the reproduced data to the host-system data buffer 50. The host-system data buffer 50 exchanges data with the magnetic-tape device 200 via a bus B. The magnetic-tape device 200 includes a processor unit 51, an I/O-address-recorder/register unit 52, a timer-counter unit 53, a ROM 54, a RAM 55, a thread-motor-driver-circuit unit 56, a revolution-count-circuit unit 57, a revolution-pulse-detection-circuit unit 58, an MDAC 59, an FDAC 60, a RD/WT-circuit unit 61, and a sensor-detection-circuit unit 62.

The processor unit 51 receives data from the host-system data buffer 50, and controls each circuit unit based on the supplied data, thereby controlling data recording, data reproducing, and magnetic-tape driving operations of the magnetic-tape device 200.

The I/O-address-recorder/register unit 52 stores therein addresses and data used by the processor unit 51 for control purposes.

The timer-counter unit 53 measures time and counts up in response to data from the I/O-address-recorder/register unit 52.

The ROM 54 stores data therein for the read-only purpose, and the RAM 55 stores therein data that is processed by the circuitry.

The thread-motor-driver-circuit unit 56 drives a threader motor 66 to achieve a threading operation. The operation of the thread-motor-driver-circuit unit 56 will be described later in detail.

The revolution-count-circuit unit 57 counts revolutions of a machine-reel motor 65 and a reel motor 67 based on pulse data supplied from the revolution-pulse-detection-circuit unit 58.

The revolution-pulse-detection-circuit unit 58 detects revolution pulses of the machine-reel motor 65 and the reel motor 67, and supplies pulse data to the revolution-count-circuit unit 57. The pulses detected from revolution of the reel motor 67 allows calculation of a distance covered by the leader block 42 (43).

The MDAC 59 converts digital signals into analog signals used for controlling the machine-reel motor 65. The FDAC 60 converts digital signals into analog signals used for controlling the loader motor 67 provided for the magnetic-tape cartridge. The signal output from the MDAC 59 is supplied to an amplifier 63, which controls a voltage supplied to the machine-reel motor 65. The signal output from the FDAC 60 is supplied to an amplifier 64, which controls a voltage supplied to the loader motor 67.

The RD/WT-circuit unit 61 controls the head 8 based on the data coming from the host-system data buffer 50.

The sensor-detection-circuit unit 62 receives data from the cartridge recognition sensor 29, and detects a type of a magnetic-tape cartridge inserted in the device. Further, the sensor-detection-circuit unit 62 receives data from a pass-A sensor 68 and a pass-B sensor 69, and detects a position of the leader block 42 (43).

The units described above together provide appropriate adjustment of the threader motor 66 to thread the leader block 42 (43) fixed to the threader arm 30.

In the following, the thread-motor-driver-circuit unit 56 will be described in detail.

Figure 9:
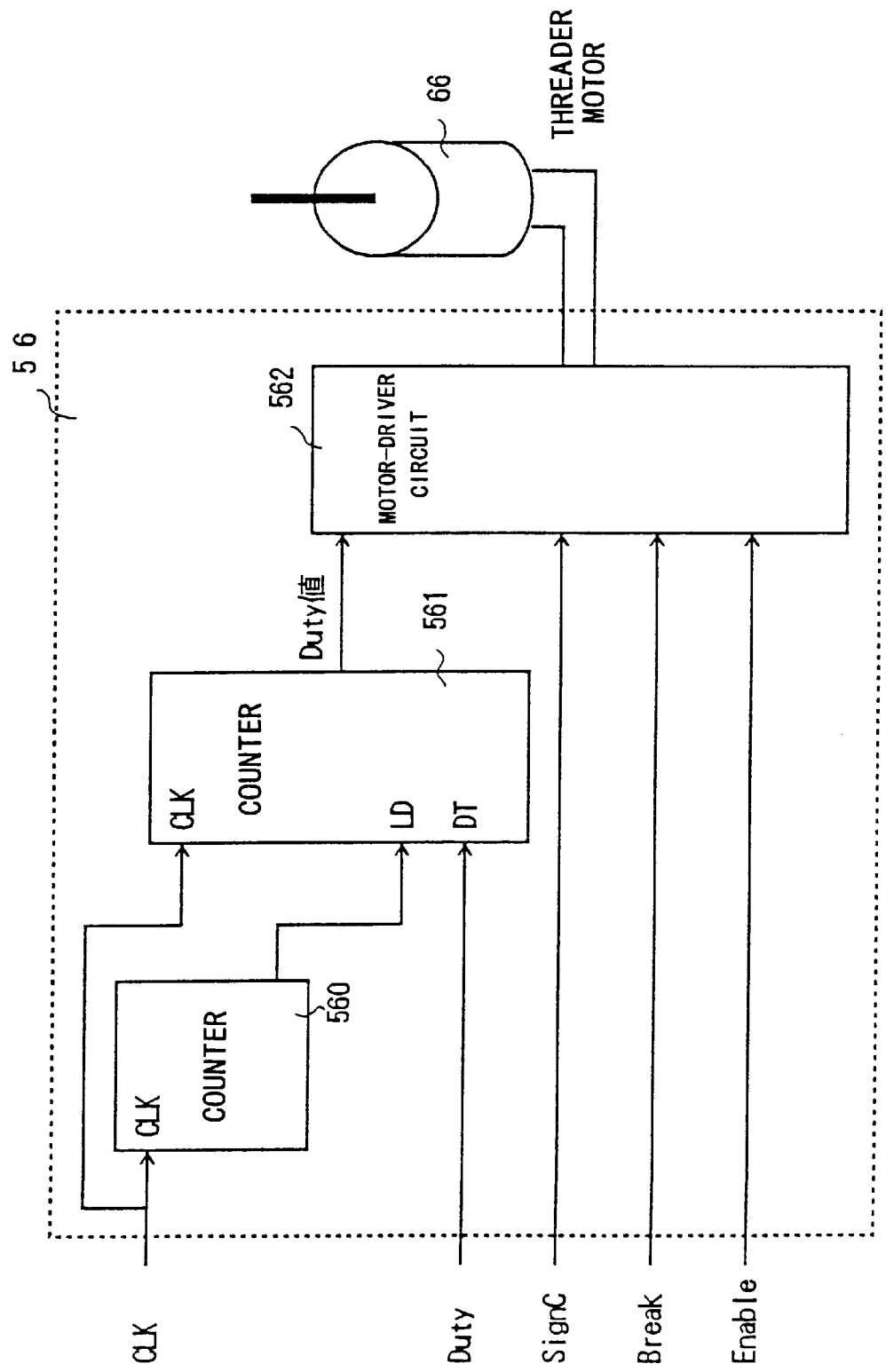
FIG. 9 is a block diagram of a thread-motor-driver-circuit unit according to the embodiment of the present invention.

FIG. 9 is a block diagram of the thread-motor-driver-circuit unit 56 according to the embodiment of the present invention.

In FIG. 9, the thread-motor-driver-circuit unit 56 includes a counter 560, a counter 561, and a motor-driver circuit 562, and is connected to the threader motor 66. A clock supplied from the I/O-address-recorder/register unit 52 is input to the counter 560 and the counter 561. The counter 560 serves to determine a pulse-width-modulation cycle, and generates a load signal LD once in every predetermined counts (i.e., at a predetermined interval). The load signal LD generated by the counter 560 is supplied to the counter 561. The counter 561 loads a duty DT in response to the load signal LD, and begin counting by starting from a count DT. The duty cycle output from the counter 561 is supplied to the motor-driver circuit 562, which also receives a break signal Break, a signal SignC, and an enable signal Enable. The signal SignC indicates a polarity of a motor voltage and a direction of motor rotation. The break signal Break indicates dynamic and costs, and the enable signal Enable controls an on/off status of the circuit. The motor-driver circuit 562 applies a driving voltage to the threader motor 66 in response to the signals described above.

When a duty ratio of 50% is selected, for example, a voltage is applied to the threader motor 66 during half the duty cycle. Adjustment of the duty ratio makes it possible to control power to be supplied to the threader motor 66, thereby controlling rotation of the threader motor 66.

In what follows, a process relating to a threading operation will be described.

Figure 10:
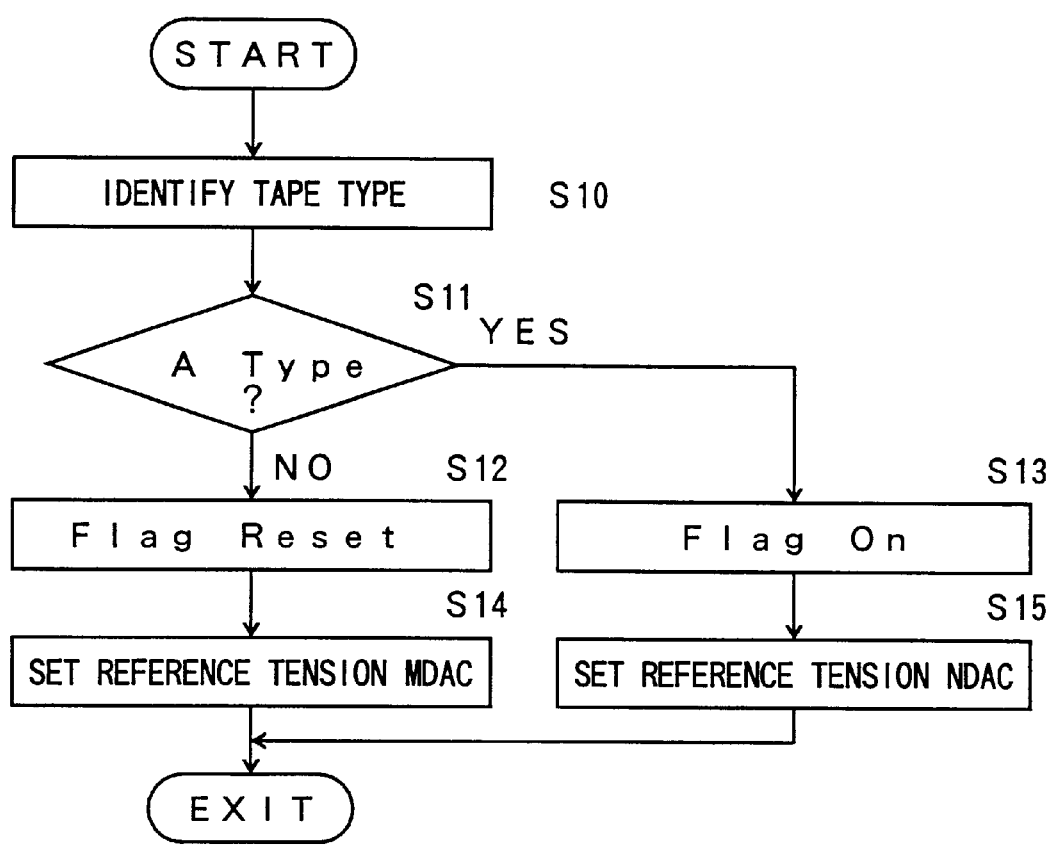
FIG. 10 is a flowchart of a preprocess that is performed before a threading operation.

FIG. 10 is a flowchart of a preprocess that is performed before a threading operation.

In FIG. 10, a type of the magnetic-tape cartridge 2 is identified by using the cartridge recognition sensor 29 under the control of the processor unit 51 (step S10). If a check (step S11) finds that the magnetic-tape cartridge is not an A type, a flag is reset (step S12). Thereafter, a tension MDAC is set as a reference to control the machine-reel motor (step S14).

If the check (step S11) finds that the magnetic-tape cartridge is an A type, a flag is set to "on" (step S13). After this, a tension NDAC is set as a reference to control the machine-reel motor (step S14).

In this manner, a type of a magnetic-tape cartridge is identified, and a tension during a threading/unthreading operation is changed according to the identified cartridge type. This is a preprocess that is performed prior to a threading operation.

In the following, a process of a threading operation will be described.

Figure 11:
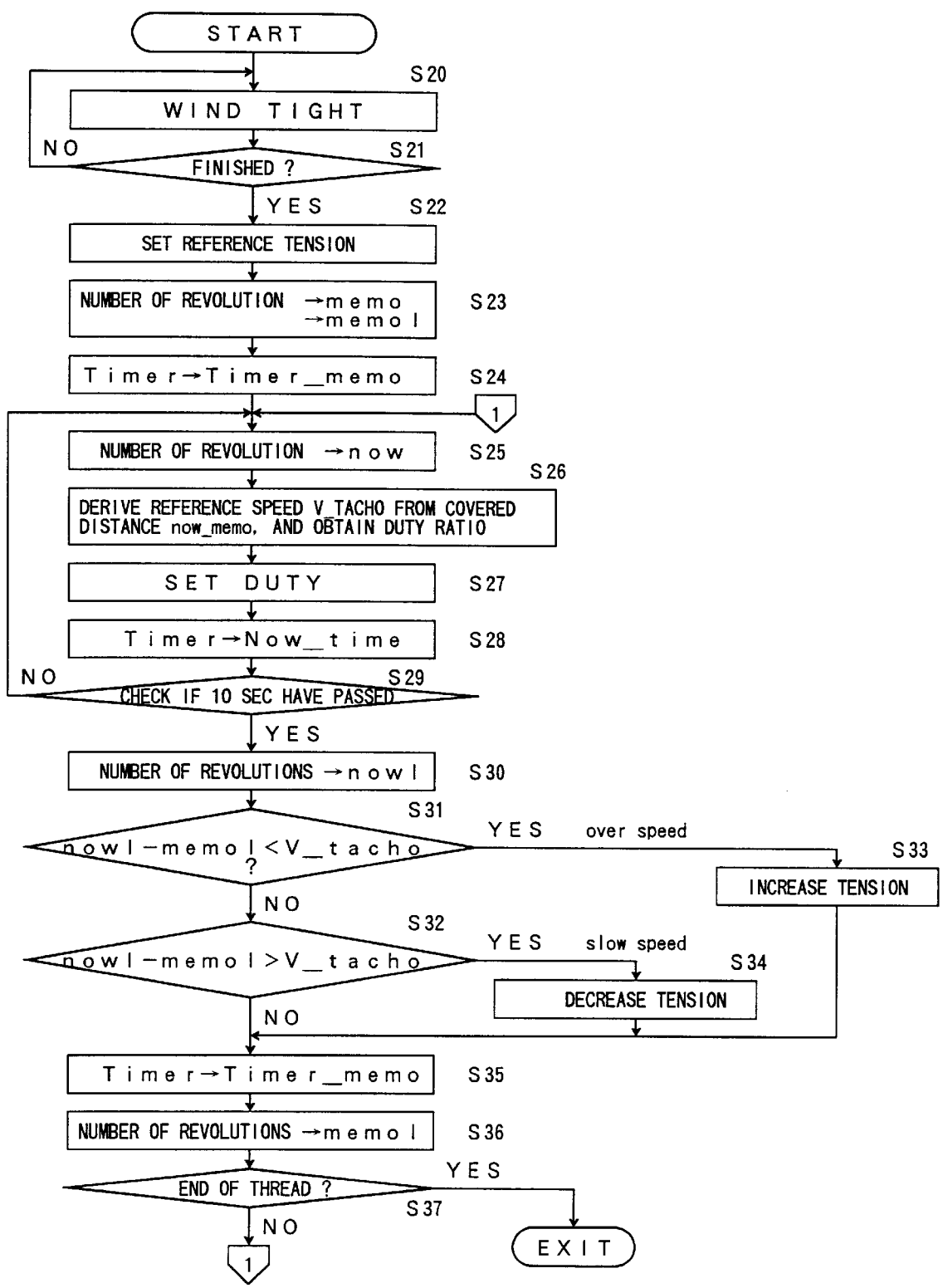
FIG. 11 is a flowchart of a process of controlling a threading operation.

FIG. 11 is a flowchart of a process of controlling a threading operation.

In FIG. 11, the magnetic tape is winded tight in order to eliminate positioning error (step S20). If a step (step S21) finds that the tight winding is not completed, the procedure goes back to the step S20. If the tight winding is complete, the procedure proceeds to control a threading operation.

A tension that serves as a reference is selected (step S22). It is arranged that this reference tension falls within a tolerance range.

The number of revolutions of the reel motor is set in "memo" and "memo1" (step S23), and time Timer is set in "Timer_memo" (step S24). In this manner, parameters relating to a threading operation are set to their initial values. Here, the number of revolutions "memo" is used for knowing a distance that is covered by a threading operation, being used for generating a thread control table. The number of revolutions "memo1" is used for monitoring and controlling speed of threading.

After the initial setting, the current number of revolutions is set to "now" (step S25). A distance covered by the threading operation is derived from "now" minus "memo", followed by obtaining a reference speed V_tacho and a control duty ratio (step S26). The duty value in the table is set (step S27). A current time indicated by the timer Timer is set to "Now_time" (step S28). A check is made as to whether more than 10 msec have passed based on a difference "Now_time" minus "Timer_memo" (step S29). If a check (step S29) indicates that 10 msec have not yet passed, the procedure goes back to the step S25 and repeat the steps described above.

If it is found that 10 msec have already passed, the number of revolutions is set in "now1" (step S30). If a check (step S31) finds that "now1" minus "memo1" is smaller than the reference speed V_tacho, tension is increased (step S33). If the check (step S31) finds that "now1" minus "memo1" is larger than the reference speed V_tacho, tension is decreased (step S34). Here, the reference speed V-tacho is a reference that is obtained from the covered distance to represent the number of revolutions per 10 msec. The processes of increasing/decreasing tension will be described later in detail.

After the speed adjustment, time Timer is set in "Timer_memo" (step S35), and the number of revolutions is set in "memo1" (step S36). Until a check (step S37) indicates a completion of the threading operation, the procedure of the step S25 and the following steps is repeated.

In this manner, the duty ratio relevant to the threading operation is obtained, and the threading speed is controlled.

In the following, the processes of tension increase/decrease at the steps S33/S34 will be described.

Figure 12:
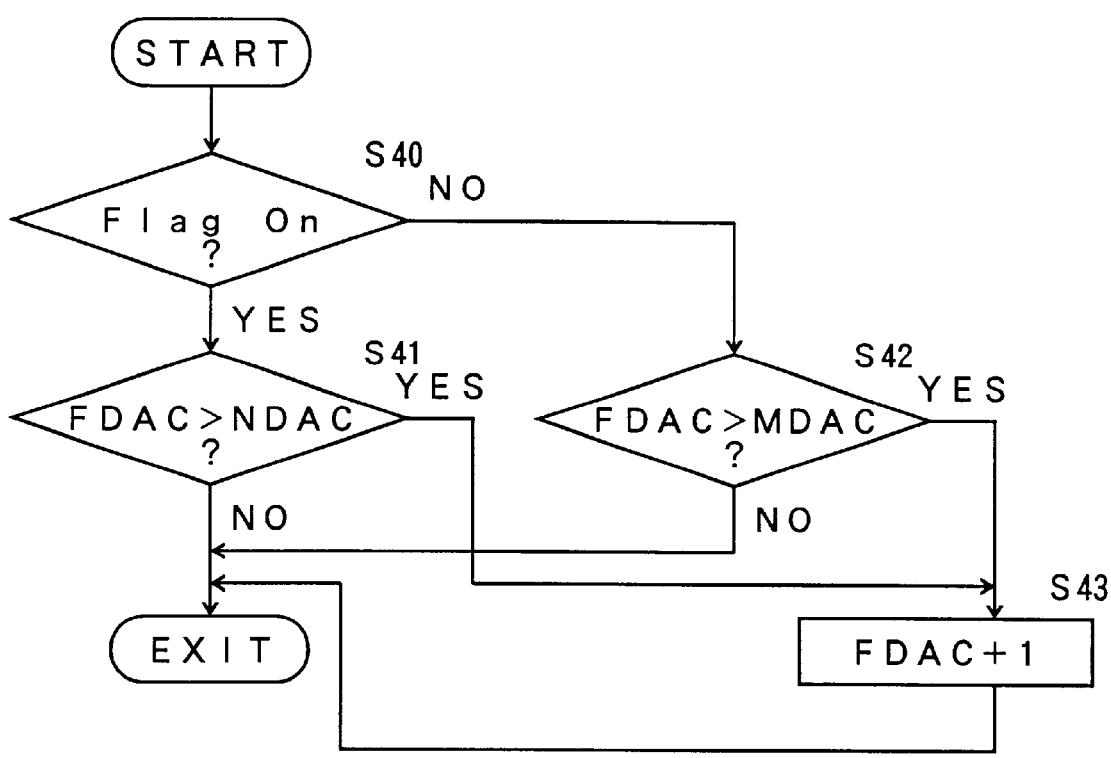
FIG. 12 is a flowchart of a process of increasing tension by controlling a reel motor.

FIG. 12 is a flowchart of a process of increasing tension by controlling the reel motor.

In FIG. 12, if a check (step S40) finds that the flag indicative of the tension NDAC being set is on, a check is made as to whether FDAC serving to control the reel motor for the magnetic-tape cartridge is greater than the reference tension NDAC (step S41). If FDAC is greater than the reference NDAC, it is ascertained that a tension in the magnetic tape is greater than the reference tension, so that the procedure ends. If FDAC is not greater than NDAC, the procedure goes to a step S43.

If the check (step S40) finds that the flag is off, a check is made as to whether FDAC serving to control the reel motor for the magnetic-tape cartridge is greater than MDAC for controlling the machine reel motor (step S42). If FDC is not greater, it is ascertained that the tension on the magnetic tape is smaller than necessary, so that the procedure goes to the step S43.

At the step S43, FDAC is incremented by 1.

Figure 13:
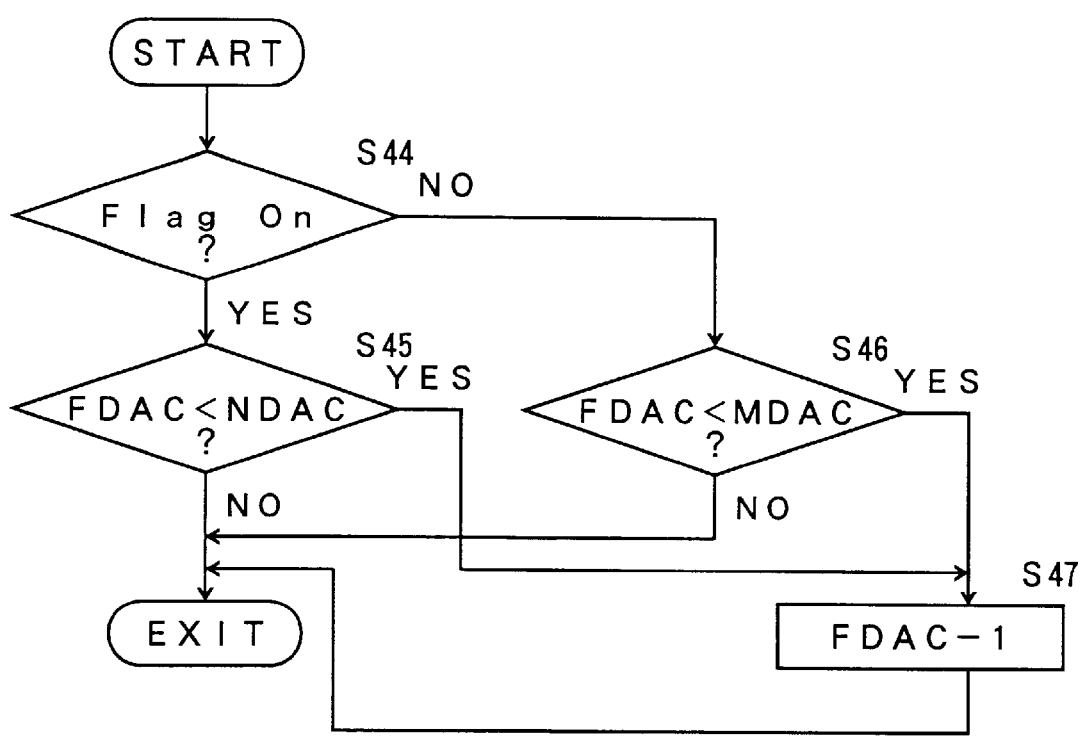
FIG. 13 is a flowchart of a process of decreasing tension by controlling a reel motor.

FIG. 13 is a flowchart of a process of decreasing tension by controlling the reel motor.

In FIG. 13, if a check (step S44) finds that the flag indicative of the tension NDAC being set is on, a check is made as to whether FDAC serving to control the reel motor for the magnetic-tape cartridge is smaller than the reference tension NDAC (step S45). If FDAC is smaller than the reference NDAC, it is ascertained that a tension in the magnetic tape is smaller than the reference tension, so that the procedure ends. If FDAC is not smaller than NDAC, the procedure goes to a step S47.

If the check (step S44) finds that the flag is off, a check is made as to whether FDAC serving to control the reel motor for the magnetic-tape cartridge is smaller than MDAC for controlling the machine reel motor (step S46). If FDC is not smaller, it is ascertained that the tension on the magnetic tape is greater than necessary, so that the procedure goes to the step S47.

At the step S47, FDAC is decreased by one.

In this manner, the speed of threading operation and the tension in the magnetic tape can be properly adjusted.

Figure 14:
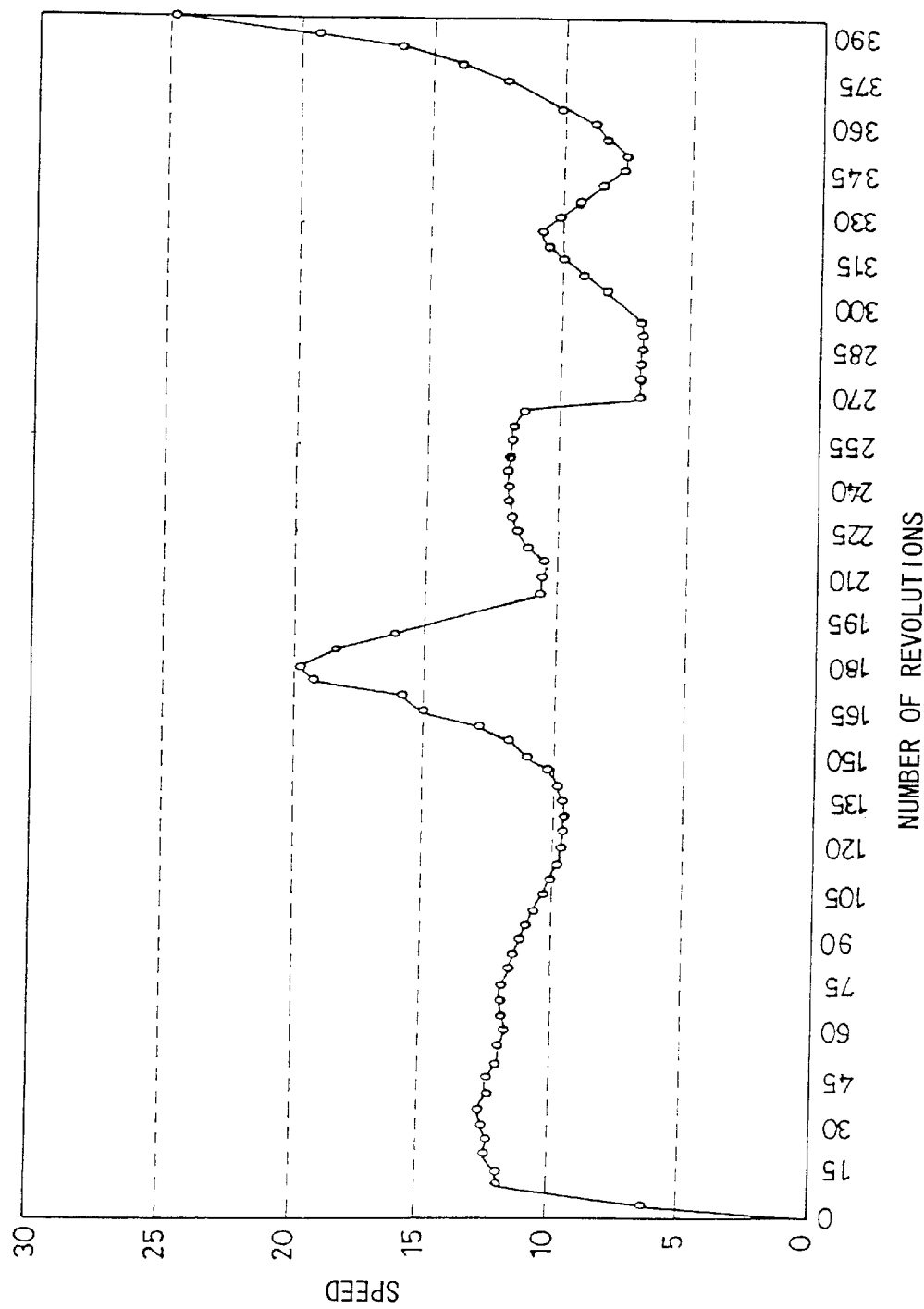
FIG. 14 is a chart showing a relation between speed of threading operation and rotations of a threader motor.

FIG. 14 is a chart showing a relation between the speed of threading operation and rotations of the threader motor.

In FIG. 14, the speed of threading is plotted on the vertical axis, and the total number of revolutions of the threader motor is plotted on the horizontal axis. What is shown in FIG. 14 is data that is obtained during a threading operation between a time when the leader block 42 (43) and the threader pin 102 start moving from the magnetic-tape cartridge and a time when the leader block 42 (43) and the threader pin 102 reach inside the machine reel 3 past the three roller guides 6. As shown in FIG. 14, the speed exhibits a rapid increase after the number of revolutions becomes 150, and reaches its peak when the number of revolutions is about 180. This corresponds to a period when the threader pin 102 and the leader block 42 (43) start moving from the magnetic-tape cartridge 2 to reach the first one of the roller guides 6. After this, the speed shows a rapid decrease until the number of revolutions becomes 225. Then, the speed stays substantially unchanged until the number of revolutions is around 270. After this, the speed drops. At this point of time, the leader block 42 (43) and the threader pin 102 have passed the first one of the roller guides 6 to reach the second one of the roller guides 6.

Figure 27:
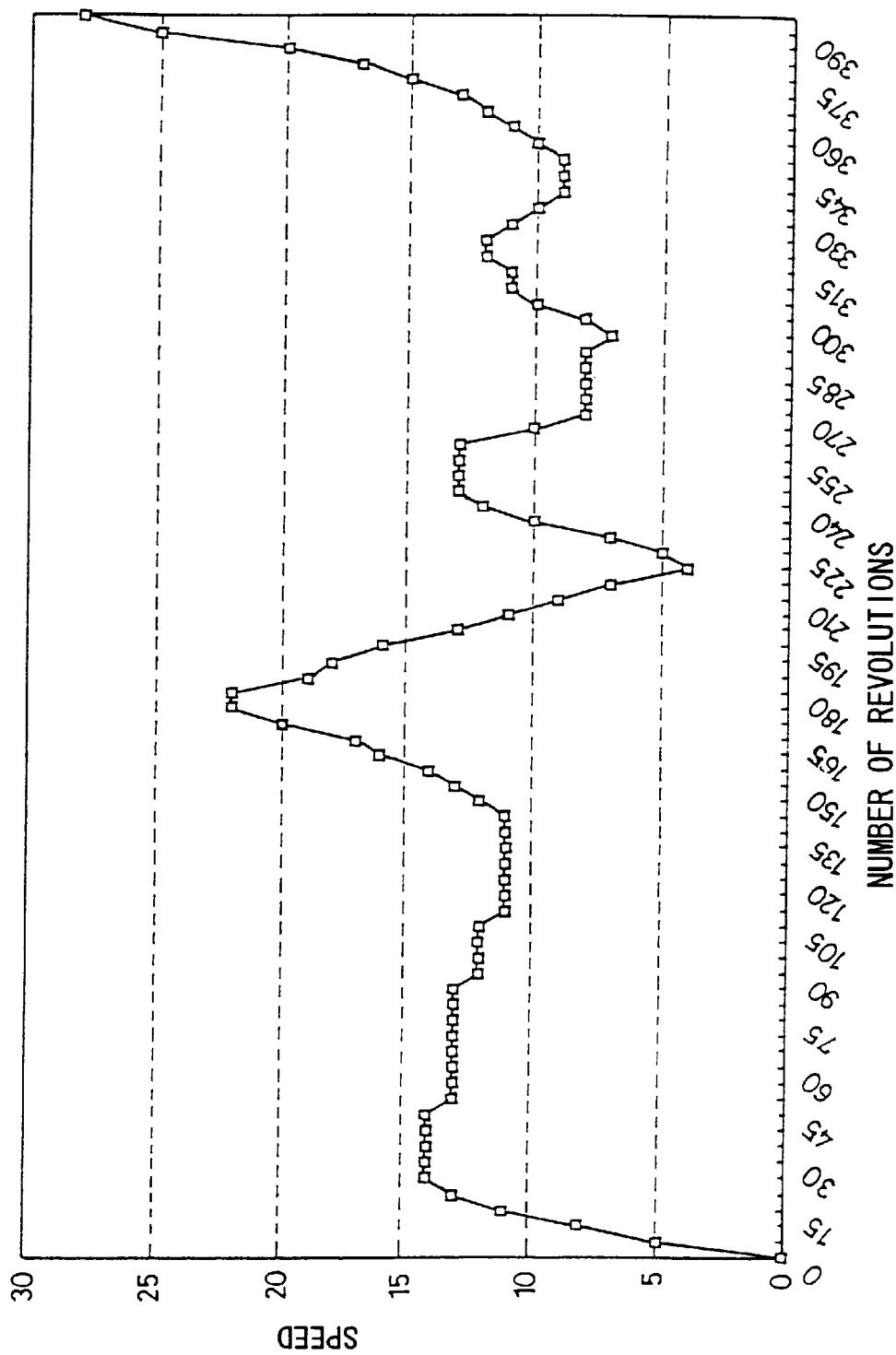
FIG. 27 is a chart showing a relation between speed of the leader block at a time of threading and rotations of a threader motor.

As is apparent from comparison with FIG. 27, the present invention successfully suppresses volatile speed change. This means that a tension in the magnetic tape is properly controlled.

The speed control of threading operation is performed as follows.

Figure 15:
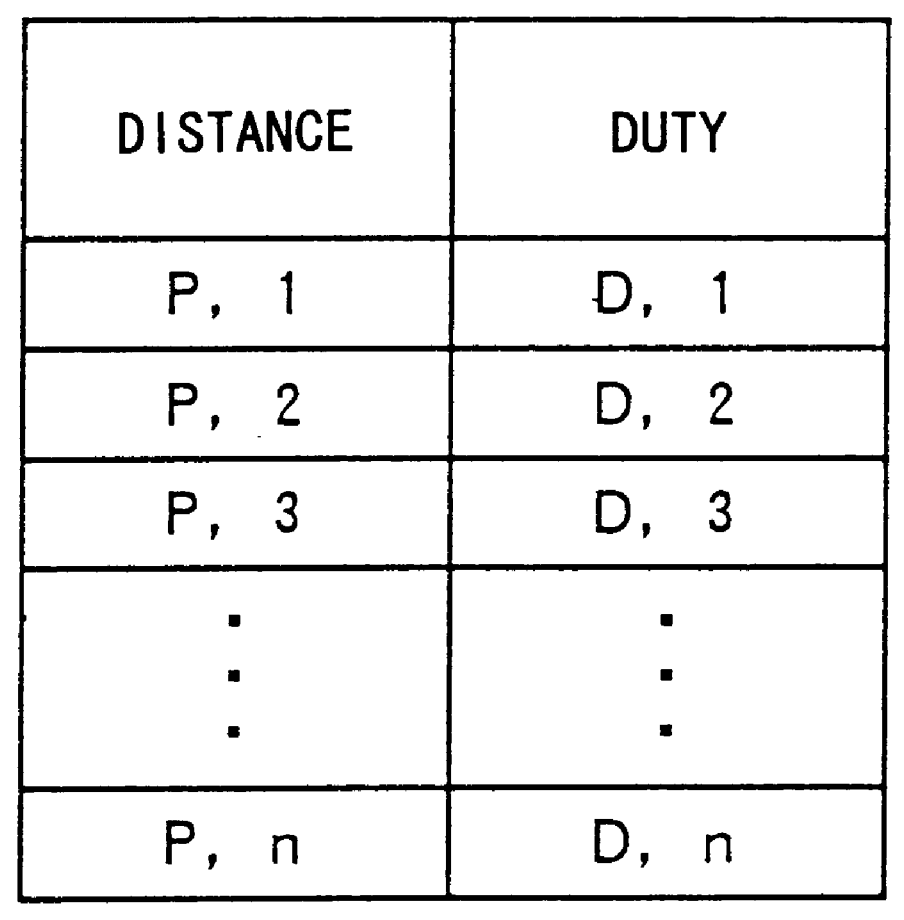

FIG. 15 is a table showing a relation between duty values and distances covered by a threading operation.

Distances P1 through Pn covered by a threading operation are obtained from the number of revolutions of the reel motor. Based on the distances P1 through Pn, duty values D1 through Dn corresponding to the respective distances are obtained to control the speed of threading operation.

Figure 16:
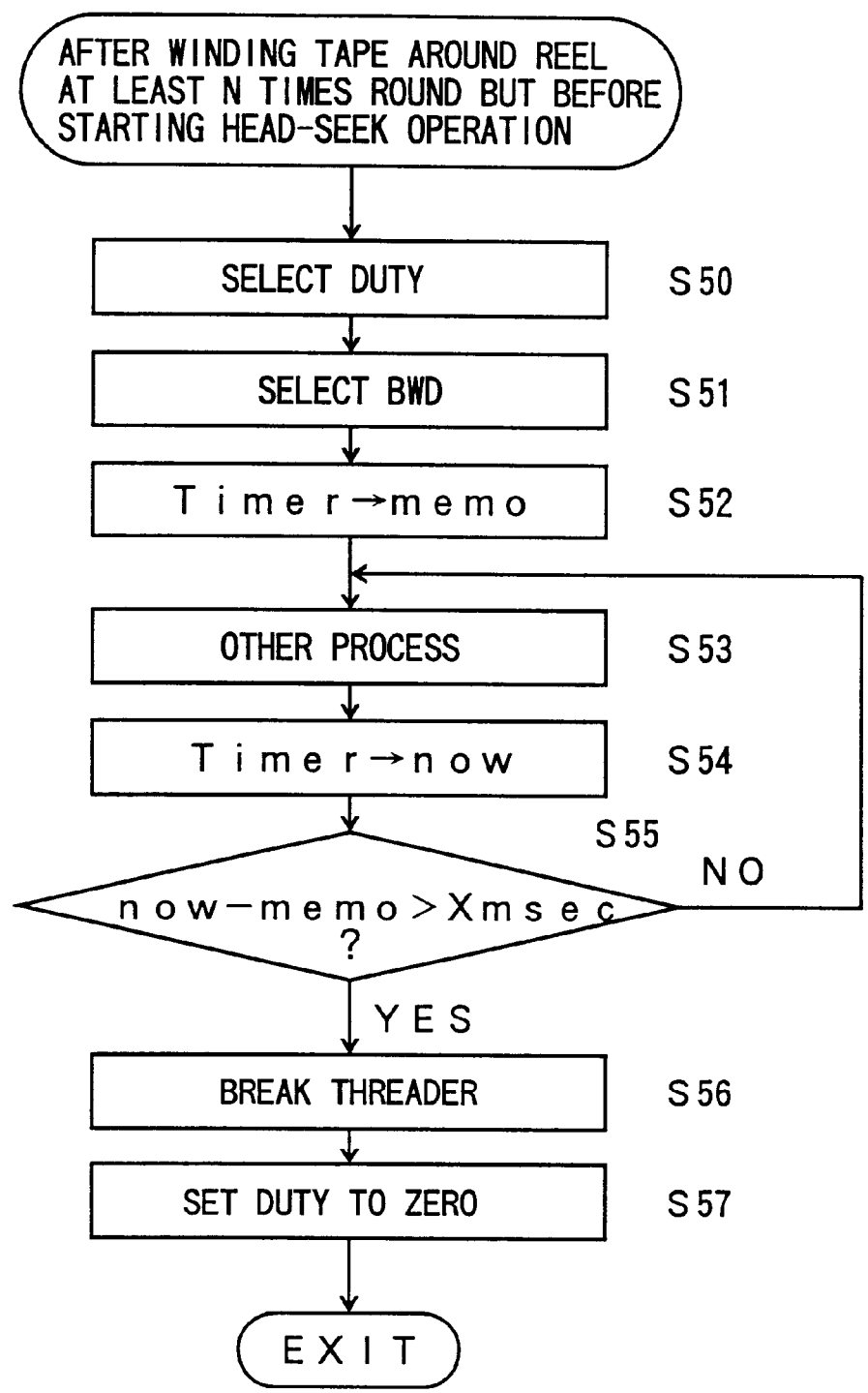
FIG. 16 is a flowchart of a process of correcting eccentricity of a threader pin after completion of a threading operation.

FIG. 16 is a flowchart of a process of correcting eccentricity of a threader pin after completion of a threading operation.

The process of FIG. 16 will be performed to correct eccentricity of a threader pin between a time when the tape is winded around the machine reel and a time when a head-seek operation is performed.

The procedure starts with selecting of a threader duty value (step S50). Then, a direction of threading is set to "BWD" indicating a backward direction (i.e., an unthreading direction) (step S51).

A time indicated by the timer Timer is set in "memo" (step S52). Other processes such as controlling the reel motor are performed (step S53). Then, a time indicated by the timer Timer is set in "now" (step S54). If a check (step S55) finds that time having passed since the start of operation ("now"—"memo") is shorter than a predetermined time period X msec, the procedure goes back to repeat the steps S53 and S54. If the time having passed since the start of operation is longer than the predetermined time period X sec, a break signal Break is supplied to the thread-motor-driver-circuit unit 56. Finally, the duty value is reset (step S57).

In this manner, the threader motor is driven in the unthreading direction for the predetermined time period to move the threader pin slightly backward after the leader block is set in the machine reel. This results in the threader pin being adjusted in a proper position.

Further, the amount of correction shift that is made to the threader pin may be derived from an angular shift of the threader arm 30 that is effected by the threader gear 31 (see FIG. 4).

Figure 17A:
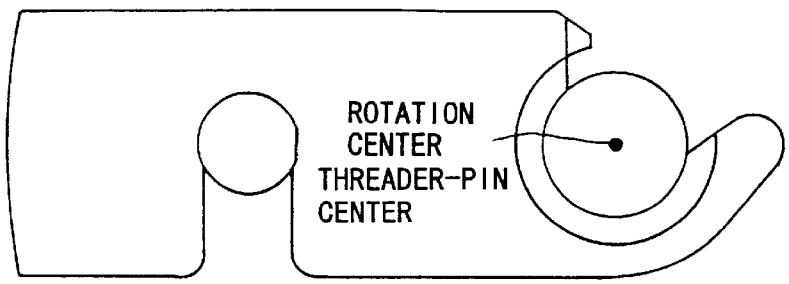
FIGS. 17A through 17C are illustrative drawings showing various positions of a threader pin.
Figure 17B:
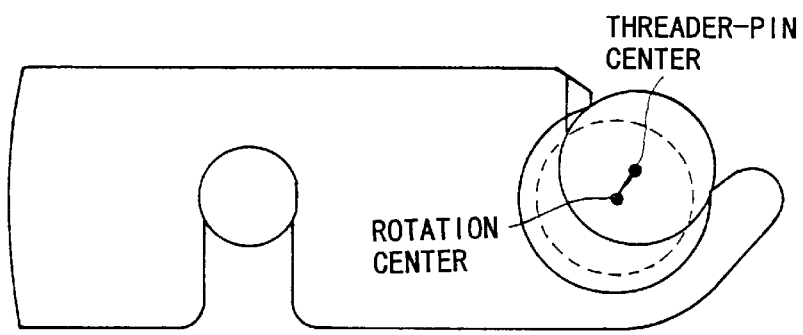
Figure 17C:
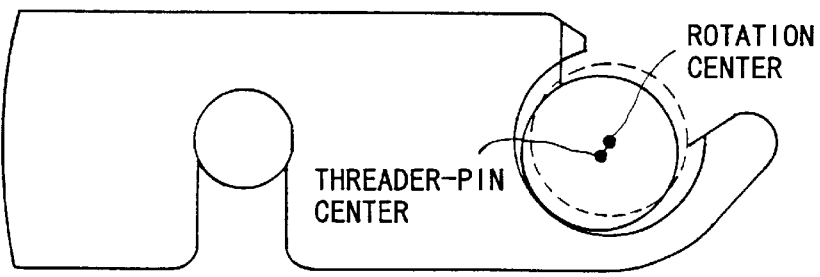

FIGS. 17A through 17C are illustrative drawings showing various positions of a threader pin.

FIG. 17A shows a situation where the threader pin is placed at a proper position with its center coinciding with a rotation center of a threading operation. FIG. 17B shows a situation where the threader pin is positioned with a slight displacement towards the opening of the recess. In this case, the center of the threader pin is displaced from the rotational center of the threading operation.

FIG. 17C shows a situation where the threader pin is positioned with a slight displacement deeper into the recess. In this case, the center of the threader pin is displaced from the rotational center of the threading operation.

In the situations as shown in FIGS. 17B and 17C, a displaced center creates vibration at the time of threading operation, and such vibration propagates to the threader plate and other components of the device. The correction process of FIG. 16 can reposition the threader pin at an appropriate position as shown in FIG. 17A, thereby suppressing vibration during the threading operation.

In the following, another embodiment for preventing vibration will be described.

Figure 18A:
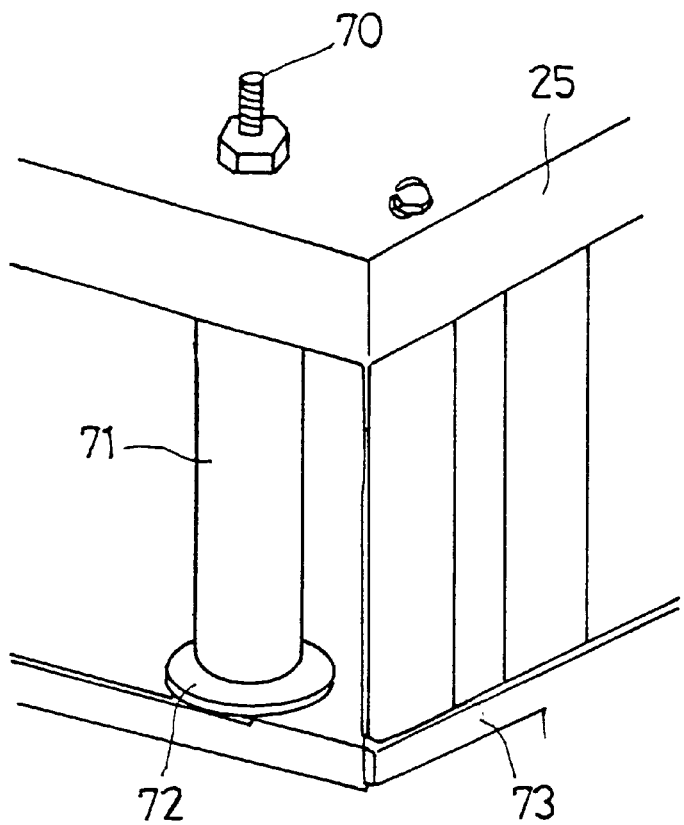
FIGS. 18A and 18B are illustrative drawings showing a stud provided as additional support for a threader plate.
Figure 18B:
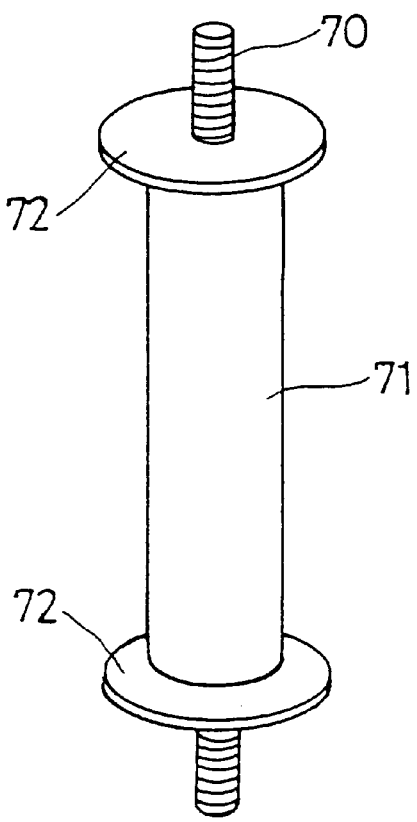

FIGS. 18A and 18B are illustrative drawings showing a stud provided as additional support for the threader plate 25.

FIG. 18A shows a stud together with the threader plate 25, and FIG. 18B shows the stud alone. A structure shown in FIG. 18A includes the threader plate 25, a stud 70 for reinforcing support for the threader plate 25, a anti-vibration rubber member 71, metal members 72 provided at both ends of the anti-vibration rubber member 71, and a threader-portion board 73. The stud 70 connecting between the threader plate 25 and the threader-portion board 73 is provided with the anti-vibration rubber member 71 and the metal members 72. This configuration serves to suppress vibration caused by a threading operation, thereby making it possible to properly record data in and reproduce data from a magnetic tape.

According to the present invention as described hereinbefore, a threader pin is configured such as to fit in a recess of various kinds of leader blocks that differ from one type of magnetic-tape cartridge to another type of magnetic-tape cartridge. This threader pin makes it possible to properly fix the leader block, thereby achieving proper threading operation and attaining improved compatibility of magnetic-tape cartridges.

Further, a type of a magnetic-tape cartridge is identified so that threading control is attended to according to the identified type of a magnetic tape. That is, appropriate speed control is put in place during threading/unthreading operation. This prevents damage from being inflicted to the magnetic tape and data from being lost.

Moreover, a stud and anti-vibration rubber are provided to prevent the threader plate 25 from vibrating. This helps to avoid tracking errors, thereby making it possible to correctly record and reproduce data by using the magnetic tape. An improvement in performance of the magnetic tape device is thus attained.

Further, the present invention is not limited to these embodiments, but various variations and modifications may be made without departing from the scope of the present invention.

The present application is based on Japanese priority application No. 11-230584 filed on Aug. 17, 1999, with the Japanese Patent Office, the entire contents of which are hereby incorporated by reference.

What is claimed is:

1. A device for receiving a tape cartridge having a reel and a record tape wound around the reel where the record tape has a mounting unit attached to one end thereof, comprising:

an engaging unit which engages with the mounting unit;

a threader arm which carries said engaging unit together with the mounting unit along a predetermined path to thread the record tape in said device during a threading operation and to unthread the record tape from the said device during an unthreading operation;

a reel motor which drives the reel of the tape cartridge; and a control unit which controls said reel motor to adjust tension in the record tape during the threading operation and the unthreading operation by controlling threading speed of the threading operation, wherein the threading speed of the threading operation is controlled based on predetermined relationships between distances covered by the threading operation and desired threading speeds.

2. The device as claimed in claim 1, further comprising a sensor unit which identifies a type of the tape cartridge, wherein the control unit controls said reel motor to adjust the tension in the record tape according to the identified type.

3. A device for receiving a tape cartridge having a record tape therein where the record tape has a mounting unit attached to one end thereof, comprising:

an engaging unit which engages with the mounting unit; and a threader arm which carries said engaging unit together with the mounting unit along a predetermined path to thread the record tape in said device, said engaging unit being configured to securely fit in said mounting unit for at least two different types of tape cartridges while a position of said engaging unit in a vertical direction relative to said mounting unit remains the same regardless of types of tape cartridges.

4. The device as claimed in claim 3, wherein said mounting unit includes a recess, and said engaging unit includes a pin head that engages with said recess, wherein said pin head has a shape that is formed by connecting two concentric cylinders in series, said two concentric cylinders having different diameters.

5. A device for receiving a tape cartridge having a record tape therein where the record tape has a mounting unit attached to one end thereof, an engaging unit which engages with the mounting unit;

a reel;

a threader arm which carries said engaging unit together with the mounting unit along a predetermined path in a threading direction in said device to engage said mounting unit in said reel;

a threader motor which drives said threader arm; and a control unit which controls said threader motor to drive said threader arm in an unthreading direction opposite to said threading direction for a predetermined time period while said mounting unit is being engaged in said reel before any data is recorded in or reproduced from the record tape.

* * * * *

UNITED STATES PATENT AND TRADEMARK OFFICE
CERTIFICATE OF CORRECTION

PATENT NO. : 6,683,741 B1
DATED : January 27, 2004
INVENTOR(S) : Kobayashi et al.

It is certified that error appears in the above-identified patent and that said Letters Patent is hereby corrected as shown below:

Title page,
Item [57], ABSTRACT,
Line 2, delete "winded" and insert -- wound -- therefore.

Signed and Sealed this

Sixth Day of July, 2004

JON W. DUDAS
*Acting Director of the United States Patent and Trademark Office*